United States Patent [19]
Blankenbecler et al.

[11] Patent Number: 6,089,711
[45] Date of Patent: Jul. 18, 2000

[54] RADIAL GRADIENT CONTACT LENSES

[76] Inventors: Richard Blankenbecler, 974 Cottrell Way, Stanford, Calif. 94305; Paul K. Manhart, 7901 E. Garland Dr., Tucson, Ariz. 85750

[21] Appl. No.: 08/964,507

[22] Filed: Nov. 5, 1997

Related U.S. Application Data

[60] Provisional application No. 60/030,002, Nov. 7, 1996.
[51] Int. Cl.[7] .............................. G02C 7/04; G02B 3/00
[52] U.S. Cl. .................... 351/160 R; 359/652; 359/653; 359/654
[58] Field of Search ......................... 351/160 R, 160 H, 351/161–167, 176; 359/652–654

[56] References Cited

U.S. PATENT DOCUMENTS

| | | | |
|---|---|---|---|
| 4,580,882 | 4/1986 | Nuchman et al. | 351/161 |
| 4,601,545 | 7/1986 | Kern | 350/347 |
| 5,220,359 | 6/1993 | Roffman | 351/177 |
| 5,530,491 | 6/1996 | Baude et al. | 351/169 |

FOREIGN PATENT DOCUMENTS

| | | |
|---|---|---|
| 63-204228 | 8/1988 | Japan . |
| 63-204229 | 8/1988 | Japan . |

OTHER PUBLICATIONS

G.A. Fry, "The Eye and Vision", chapter1 in "Applied Optics" vol. 2 ed. by R. Kingslake pp. 1–27, 1965.

Y. Koike, et al., "Gradient–Index Contact Lens", Applied Optics, vol. 34, No. 22, Aug. 1995.

M. Harrigan, "Some First Order Properties of Radial Gradient Lenses compared . . . ", Applied Optics, vol. 23, No. 16, Aug. '84.

J. Benshop and J. Braat, "Gradient Index Objectives for CD Applications", Applied Optics, vol. 26, No. 7, Apr. 1987.

*Primary Examiner*—Georgia Epps
*Assistant Examiner*—Jordan M. Schwartz
*Attorney, Agent, or Firm*—Steven Mitchell

[57] ABSTRACT

A radial gradient contact lens is provided. The methodology described above allows the parameters of the lens and of the radial gradient profile to be chosen to improve the vision and the comfort of the wearer. The lens can be made thinner and the optical performance remains improved as the CL moves around in the eye. The improved vision leads to higher contrast when the iris of the eye is fully open as it is under low light level conditions. The use of an anamorphic lens consisting of an elliptical index profile for use in correcting astigmatism is described.

5 Claims, 22 Drawing Sheets

Radial Gradient

Original Preform

Elliptical Gradient

Preform after Elliptical Draw

Anamorphic Lens

Preform after reshaping

RADIAL GRADIENT CONTACT LENSES

This application claims the benefit of U.S. Provisional Application Ser. No. 60/030,002 filed Nov. 7, 1996.

FIELD OF THE INVENTION

The present invention relates generally to contact lenses for ophthalmic use, and more particularly to lenses with a spatially varying index of refraction.

BACKGROUND

A conventional general purpose lens with spherical surfaces and with a homogeneous index of refraction will not focus light perfectly; there will be spherical and chromatic aberrations. These two aberrations can be reduced, for example, by using multiple lenses in which each lens has a unique index of refraction and dispersion. Spherical aberration can also be corrected for a single lens with the correct choice of aspheric surface.

It is well known in optics that aberrations in optical systems can be reduced by employing lens elements with a spatially varying index of refraction. These GRadient INdex elements are termed GRIN elements. The material for the fabrication of such gradient lenses can be made by a variety of processes such as SOL-GEL, infusion, and diffusion and may be glass, plastic or other suitable optical material. The two most common index geometries discussed are the 'axial' gradient, in which the index is constant in a two dimensional plane but varies in the direction perpendicular to the plane, and the 'radial' gradient, in which the index is constant in circular cylinders around the optical axis, but varies as a function of the radius.

The physics of the propagation of light rays in a medium with a gradient index of refraction is well understood. For example, the trajectories of the rays can be calculated analytically in many cases, see, for example, the paper by Michael E. Harrigan, "Some first-order properties of radial gradient lenses compared to homogeneous lenses", pp. 2702–2705, Applied Optics, Vol. 23, No. 16, August 1984. Designs for useful optical systems that utilize radial gradient optical elements have been produced. Among these see J. Benschop and J. Braat, "Gradient-index objectives for CD applications", pp. 1195–1200, Applied Optics, Vol. 26, No. 7, April 1987, and H. Nishi, H. Ichikawa, M. Toyama and I. Kitano, "Gradient-index objective lens for compact disk system", pp. 3340–3344, Applied Optics, Vol. 25, No. 19, Oct. 1986.

The possible use of an anamorphic GRIN lens in which the surfaces of constant index (isoindicial surfaces) are elliptical cylinders around the optical axis has been discussed by J. M. Stagaman and D. T. Moore, "Laser diode to fiber coupling using anamorphic gradient-index lenses", pp. 1730–1734, Applied Optics, Vol. 23, No. 11, June 1984. To the present inventors' knowledge, GRIN material with such a geometry has not been commercially available.

Most commercially available optical design software programs provide the designer with appropriate software tools to design with GRIN elements. Exact calculations of the gradient properties needed to achieve a required performance of such a lens can be performed by several commercially available optical design software packages. Examples of commercially available software that offer GRIN design capabilities include "Code V" available from Optical Research Associates of Pasadena, Calif., "Synopsis" from BRO, Inc. of Tucson, Ariz., and "ZEMAX" from Focus Software, Inc. of Tucson, Ariz. These lens design codes give the designer many choices for gradient types, glass types, and chromatic models.

For a general introduction to the structure of the eye and its optical properties, see Chapter 15, entitled "Vision", in Applied Optics, A Guide to Optical System Design, Vol. 2, by Leo Levi, John Wiley & Sons, New York, (1968) and Chapter 1, entitled "The Eye and Vision" by Glenn A. Fry, in Applied Optics and Optical Engineering, Vol. 11, edited by Rudolf Kingslake, Academic Press, New York, (1965).

A standard contact lens has a homogeneous index of refraction and has spherical surfaces. It will be hereafter abbreviated as an HCL. The optical power of the lens is chosen to correct the error in the focal length of the natural eye of the wearer. Since the index of refraction is constant throughout the lens, the parameters available to the optical designer are the index and anterior radius of curvature, RA, of the lens. The posterior radius of curvature, RP, of the lens must be chosen to closely match that of the anterior (front) surface of the eye. The optical power of a homogeneous lens arises only from the curved exterior surfaces of the lens, the index of refraction, and to a small extent, the thickness which typically is made as thin as possible to maximize $O_2$ transport to the cornea, and $CO_2$ from the cornea. This allows the eye to breath and is a factor in comfort, extended wear, and health.

A conventional contact lens with spherical surfaces and with a homogeneous index of refraction will not focus light perfectly; there will be spherical and chromatic aberrations. The chromatic aberrations are normally not very noticeable or distracting to the user because the eye can change focus rapidly and the brain can process the information. Spherical aberration however is quite noticeable and bothersome to the wearer; the increased blur size, due to spherical aberration, cannot be compensated for by focus or information processing. The two lens system consisting of the conventional homogeneous contact lens together with the lens in the eye cannot eliminate the spherical aberrations in ophthalmic applications. This is due to the lack of parameters that are at the disposal of the optical designer. A homogeneous CL with spherical surfaces can correct for refractive errors in the eye, a first order error in optical power, but there are no degrees of freedom left to correct for aberrations. Therefore, there is need for an improved system in which these aberrations can be reduced.

Under low light level conditions, the iris diaphragm of the eye increases in diameter. This increase in aperture lets more light in but leads to increased spherical aberration even in the standard, or emmetropic (20/20), eye. The same effect occurs in an eye corrected for refractive errors in focal length, or power, using a homogeneous CL. Spherical aberration results in an increased spot diameter at the retinal focus and therefore results in a loss of visual fidelity. This loss in fidelity results in a loss of contrast sensitivity and a severe degradation in visual acuity. Therefore there is need for an improved system in which this loss in visual fidelity can be ameliorated for both the normal and corrected eye.

One of the properties of a contact lens is that it tends to move around in the eye, or drift, as it is worn. The optical axis of the eye and the axis of the CL are not always coincident. This leads to a loss of visual fidelity manifesting from an apparent defocus. Therefore there is need for an improved system in which deleterious effects of the drift in position can be reduced.

A contact lens can be worn for only a finite time. This time may vary from individual to individual and is due to a lack of gaseous, ($O_2$ and $CO_2$), exchange between the corneal surface of the eye and the atmosphere. This exchange depends upon the material used for the CL and also upon the thickness of the lens. In general, the thinner the lens, the better the gaseous transport between cornea and air. For lenses of positive power, the edge thickness of the HCL is less than the center thickness. For negative power lenses, (so-called minus lenses), the edge thickness of the HCL is greater than the center thickness. The gaseous transport of a minus lens decreases as a function of aperture because of the increased edge thickness. For positive power lenses, (plus lens), the overall HCL diameter is limited because of the diminished edge thickness and/or the center thickness of the lens must be increased. Therefore there is need for an improved contact lens which can be as thin as possible and with a relatively constant thickness over the aperture, but still perform the required optical functionality.

The present manufacturing techniques used to fabricate contact lenses are reasonably cost effective. However, there is always a need for an improved contact lens design which can be manufactured by a simpler and cheaper process. An HCL is commonly made by two different methods. A circular flat disk, called a button, is produced of the selected material. In the first method, this button is put in a lathe and the front and rear surface are carved to the specified radius of curvature and then polished. In the second method, the button is placed on a spherical surface with a specified radius of curvature, heated until it deforms to the shape of the surface, thereby forming one of the surfaces of the completed CL, and then this 'warped' button is lathed to cut the other optical surface.

It is an object of the invention to provide a contact lens system utilizing a radial and/or a combination of radial and axial gradient index of refraction, herein termed a conical gradient. One essential component of the invention is to develop a description of the optical parameters of an optically imperfect, or ametropic, eye and then use it in the design of the RGRIN contact lens parameters so as to optimize the performance of the combined optical system.

It is still another object of the invention to provide a contact lens system which improves the contrast sensitivity and resolution of the eye under low light level conditions. Such an improvement in the performance of the eye is useful even for individuals that have emmetropic, i.e., (20/20), vision under bright light conditions. This is accomplished by reducing spherical aberration.

It is yet another object of the invention to provide a contact lens system which can correct the eyesight of the wearer if astigmatism is present. In this case the correction is made by using a CL with an elliptical index of refraction profile.

It is still another object of the invention to provide a contact lens system which can manufactured by a simplified fabrication process.

It is a further object of the invention to provide a bifocal correction in a single RGRIN CL by use of an index profile that is not monotonically rising or falling.

It is still another object of the invention to provide a contact lens system which improves the contrast sensitivity and resolution of the eye of the wearer with near-sightedness, (Myopia)

It is still another object of the invention to provide a contact lens system which improves the contrast sensitivity and resolution of the eye of the wearer with far-sightedness, (Hyperopia)

SUMMARY OF THE INVENTION

The present invention comprises a contact lens having a spatially varying index of refraction and a substantially constant thickness over at least the portion of the lens which will cover the aperture of the wearer's eye. In a preferred embodiment of the invention, a the contact lens comprises a radial gradient index, or RGRIN, contact lens having a spatially varying index of refraction as measured radially from the optical axis of the lens. In general, the use of RGRIN material for CL's can eliminate the meniscus type lens with the thinner edge thickness. By using the higher order optical functionality of the gradient profile, spherical aberration is controlled, increasing the 'sweet spot' size; that is, since contact lenses shift their position relative to the natural optical axis in the eye during normal wear, the increased number of optical design parameters are used to preserve the quality of the image as the lens moves away from the pupil's center. Stated differently, a reduction in the spherical aberration over a large aperture is provided with lenses of the invention. A further benefit of the invention is that the use of RGRIN material allows a decrease in CL thickness, thereby improving oxygen transport to the cornea. In another embodiment of the invention, a contact lens having an anamorphic gradient geometry to correct astigmatism is provided.

In another embodiment of the invention, a method for designing CL's incorporating GRIN material into CL's is provided.

In yet another embodiment of the invention, a fabrication method for the manufacture of RGIN lenses with elliptical index profile, hereafter termed EGRIN lenses, that can be used to correct astigmatism is provided.

BRIEF DESCRIPTION OF THE DRAWINGS

The various features and advantages of the present invention may be more readily understood with reference to the following detailed description taken in conjunction with the accompanying drawings in which.

DETAILED DESCRIPTION OF THE INVENTION

Figure 1A:
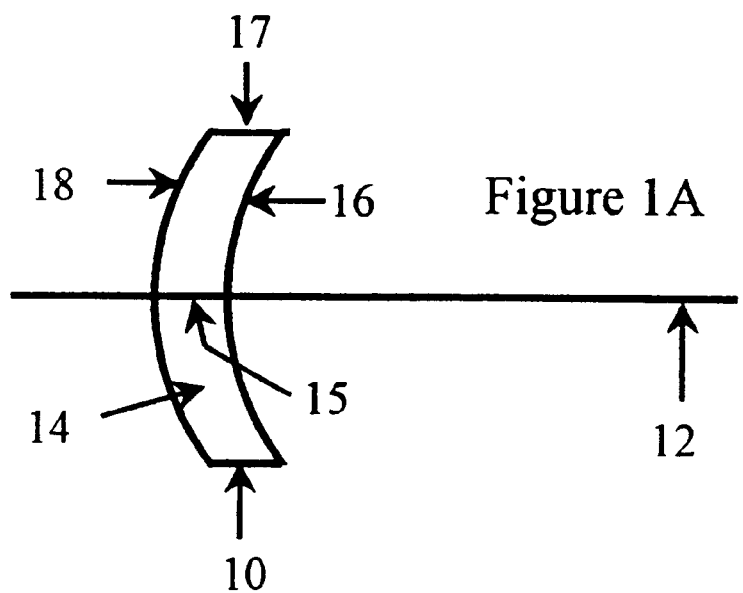
FIGS. 1A and 1B depict a conventional homogeneous contact lens of the prior art and an RGRIN contact lens of the invention, respectively and define the variables used by the designer to describe the lens.

A radial gradient index, or RGRIN, contact lens has a spatially varying index of refraction as measured radially outwards from the optical axis of the lens. The optical power of a RGRIN lens arises not only from the curved exterior surface of the lens but also from the radial variation of the index of refraction of the material. This latter contribution is called the 'inhomogeneous transfer term' in optical design parlance. Since the index of refraction of these contact lenses varies in a prescribed manner throughout the lens, the parameters available to the optical designer are not only the value of the exterior radius of curvature of the lens and the base index at the lens vertex, but also the shape of the index profile. This additional freedom allows the designer to optimize several performance features of the lens.

For example, by using the radial gradient index profile to generate optical power, the contact lens can be made thinner than a homogeneous CL with the same optical power. The decrease in CL thickness improves the gas transport to and from the cornea and this increases the time that a CL can be worn with comfort. The RGRIN CL of the invention is designed to have an essentially constant thickness. This can increase the comfort to the wearer by reducing edge thickness of the minus lens, allowing for improved gaseous transport to and from the cornea, decreasing lid/eye interaction and also can increase the maximum usable lens diameter of the CL since the lens does not grow or decrease in thickness as a function of radius.

By using the higher order optical functionality of the gradient profile, and/or inhomogeneous surface terms of the index variation over the curved surfaces, spherical aberration may be controlled and reduced over a larger aperture. Inhomogeneous surface terms arise from the variation of index over the curved surface of the gradient lens. This is equivalent to an aspheric surface and can be used to reduce aberrations of the optical system. Inhomogeneous surface terms can lead to at least two important advantages:

(1) Contact lenses constantly shift their position relative to the natural optical axis in the eye as they are worn. The increased number of optical design parameters can now be used to preserve the quality of the image as the lens moves away from the pupils center. Stated differently, this is a reduction in the spherical aberration over a larger aperture.

(2) An RGRIN CL designed using the methods presented here results in improved vision at moderate to low light levels when the eyes pupil increases in diameter. A reduction in spherical aberration leads to enhanced contrast sensitivity and improved resolution under moderate to low light levels. This improvement in night vision may be useful even for individuals that have normal eyesight, or emmetropia.

The fabrication of a CL can be simplified by using RGRIN or EGRIN lens blanks. In this method, a button is prepared with a chosen GRIN profile and thickness. The button is placed on a spherical mold and heated until one or two surfaces deform to the shape of the mold surface; this is called a 'pressed' CL. The lens is thereafter fabricated with constant thickness. If the button were homogeneous, this lens would have its optical power fixed, depending only upon the value of the index of refraction. However, with a gradient lens, the optical power can be controlled by the index profile chosen. Thus each value of optical power required for vision improvement requires a unique index profile. This can be readily achieved.

A theoretical discussion will be given on the first order or paraxial design using RGRIN lens material. Then the output from an exact optical design will be given to illustrate some of the important points made above.

In FIG. 1A a cross-section of a standard homogeneous contact lens 10 of convex-concave type with an optical axis 12 is depicted as a single representative of the prior art. A segment 14 has a constant index of refraction throughout the body of the lens. A rear or posterior surface 16 with a radius of curvature Rp is spherical and a front or anterior face 18 with a radius of curvature Ra is also a spherical surface. Their radii of curvature and the index of refraction are chosen to focus light to correct the refractive error of the following lens of the eye and to focus the light onto the retina. A central thickness 15 will be denoted by CT whereas the edge thickness 17 will be denoted by ET.

Figure 1B:
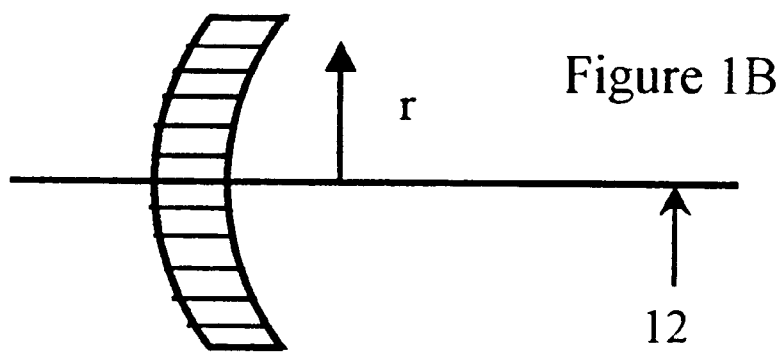

In FIG. 1B, the simplest embodiment of a radial gradient contact lens is illustrated in cross-section. Lines parallel to the optical axis 12 mark the planes of constant index of refraction in the lens.

Theoretical Treatment

Plastic GRIN material suitable for use in contact lenses has been fabricated with an in the index varying in the range $$1.45 < n < 1.60,$$

but the following discussion can be carried out for any available index range. The change in the index of refraction required for a particular application will, in general, not cover this full range.

The radial index of refraction profile is conventionally written in the form $$n(r) = n_0 + n_2 r^2 + n_4 r^4 + n_6 r^6 \ldots,$$

where r is the distance from the lens axis and the parameters $n_0$, $n_2$, $n_4$, $n_6$ etc. must be determined to define the required optical properties of the lens material. The optimum values of these parameters will be determined from the optical design of the RGRIN CL coupled with the optics of the particular eye. The results of this design process will be the desired parameters for the plastic lens blank fabrication process. The optical design will also yield the required geometry of the CL, including the thickness and the radius of curvature of the surfaces, which will be used to control the lathe cutting and subsequent polishing of the RGRIN plastic buttons.

Contact Lens Design

Using the optical design code ZEMAX, a nominal RGRIN contact lens design has been developed and will be discussed in detail in the next sections. We will first discuss a single, stand alone model for the contact lens with given specifications. Then a combined model will be discussed that unites the CL and the optics of the eye and the function of the retina and brain. It will be shown that this latter design technique will yield a CL with much superior performance. In this combined model, it is necessary to accurately describe the optics of the eye. The new schematic eye model in this invention matches clinically measured levels of longitudinal spherical aberration and longitudinal chromatic aberration, and includes all aspheric surfaces, diffraction, photopic response, and the Stiles-Crawford effect. Low order paraxial treatment is given to clarify the more exact treatment and to estimate the numerical values of basic CL parameters. The basic quantities to be used in the discussion of CL design are shown in FIG. 1. The Stiles-Crawford effect is added to the model in the form of a pupil apodizing filter. The transmission of the filter is taken from P. Moon and D. E. Spencer "On the Stiles-Crawford effect", J. Opt. Soc. Am. Vol 34, pp319–29, 1944, and is given by $$T(r) = e^{-\alpha r^2}$$

where $\alpha = 0.105$.

Theoretical Introduction

Refraction of a light ray occurs when it passes from a region with one index of refraction into a region with a different index of refraction. The amount of angular deviation depends upon the indices of the two refractive media and the angle of incidence of the light with respect to the interface normal. For a material with a continuously varying index of refraction, an optical wavefront will follow a curve while passing through the medium if the direction of wavefront propagation differs from the gradient vector. The angle of deviation $\alpha_{grin}$, induced by passage through a thickness t (assumed small) is given by $$\alpha_{grin} = -\frac{t}{n(r)} \frac{dn(r)}{dr}.$$

where n(r) is the index of refraction and r is the radial position coordinate. The index profile is parametrized to first order in the form $$n(r) = n(0) + \Delta n \frac{r^2}{R^2},$$

where R is the radius of the lens, n(0) is the value of the index of refraction at the center of the lens, and $\Delta n$ is the change in index over the range $0 \leq r \leq R$. A plane-parallel piece of material will exhibit optical power if the second term is non zero, ($\Delta n \neq 0$). An example of the above is the classic 'Wood' lens, (found in many technical references), in which the deviation angle varies linearly in r, thereby forming an approximate focus at the point f, where $$\alpha_{grin} = r/f.$$

Combining this formula for the inhomogeneous 'transfer' term with the standard results for the homogeneous 'surface' terms yields a simple formula for the focal length f of the RGRIN CL. In the paraxial approximation, higher order terms in r are neglected. The final result can be written in the form $$\frac{1}{f} = \frac{n(0)-1}{R_p R_a}[R_p - R_a] - 2\Delta_n \frac{t}{R^2},$$

where $R_p$ is the radius of curvature of the posterior surface of the CL (set by the geometry of the cornea) and is $R_a$ the radius of curvature of the anterior CL surface. Note that (1/f) is given in diopters if the radii and the thickness are given in meters.

For a homogeneous lens, $\Delta n = 0$, and the relative size and sign of the two radii of curvature of the CL surfaces determine the lens power. In the other extreme, if the two surface radii are equal, the first term is zero, and the power of the CL arises only from the gradient term.

The object of the optical design exercise is to find the relationships between the homogeneous surface term, the inhomogeneous surface term and the inhomogeneous transfer term, including the higher powers in the index expansion in r, so that aberrations are minimized over the required aperture. The inhomogeneous surface term manifests itself from the variation in index over a curved surface.

Exact Ray Tracing Results

Exact calculations of the properties needed to achieve a required performance of such a lens can be performed by any of the commercially available optical design software packages mentioned earlier.

As discussed above, the design procedure will consists of two steps. The first is to design a CL with a given power. Secondly, the CL will be combined with a model of the human eye to evaluate the CL's effect on visual performance. This technique will allow full discussion of the problem of spherical aberration as the pupil dilates to adjust for low light levels. Myopia and hyperopia will both be considered below. It will be shown that taking into account the optical properties of the eye, via the combined model, is essential for achieving the full corrective potential of an RGRIN CL.

Single Lens Model

When designing HCL's it is not as necessary to combine it with the optics of the eye because HCL's only correct for refractive errors in focal length, which is a first order property of an optical system. Hence, aberrations are not taken into account in the design of an HCL. The lens parameters for a fixed value of the posterior radius $R_p = 7.8$ mm for a required power of (−3.00) and (−5.00) diopters were determined by using the optical design program ZEMAX. The results are given in Table 1 for both a homogeneous CL and an RGRIN CL for the smaller index range. These 'stand alone' designs yield correct diopter correction and spherical aberration correction for RGRIN lenses but the 'stand alone' RGRIN CL design was found to yield inferior performance when coupled with the eye model. Thus, it is imperative to design RGRIN CL in conjunction with the optics of the eye. Koike et. al., referenced above, designed standalone CL's with zero spherical aberration. However the true power of the RGRIN material is to design a CL with the appropriate level of spherical aberration to compensate for the inherent spherical aberration of the eye.

TABLE 1

Stand Alone Contact Lens Parameters

| Power (diopters) | n(0) | Delta n | Ra | Diameter | MTF at 15 cy/deg | MTF at 30 cy/deg |
| --- | --- | --- | --- | --- | --- | --- |
| −3 | 1.48 | 0.0000 | 8.241 | 8 | NA | NA |
| −3 | 1.48 | 0.0065 | 8.303 | 8 | NA | NA |
| −5 | 1.48 | 0.0000 | 8.532 | 8 | NA | NA |
| −5 | 1.48 | 0.0115 | 8.538 | 8 | NA | NA |

Figure 2:
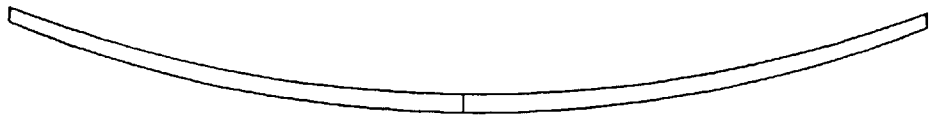
FIG. 2 depicts an RGRIN contact lens of prior art that has been optimized to correct spherical aberration without regard to the optics of the eye.
Figure 3:
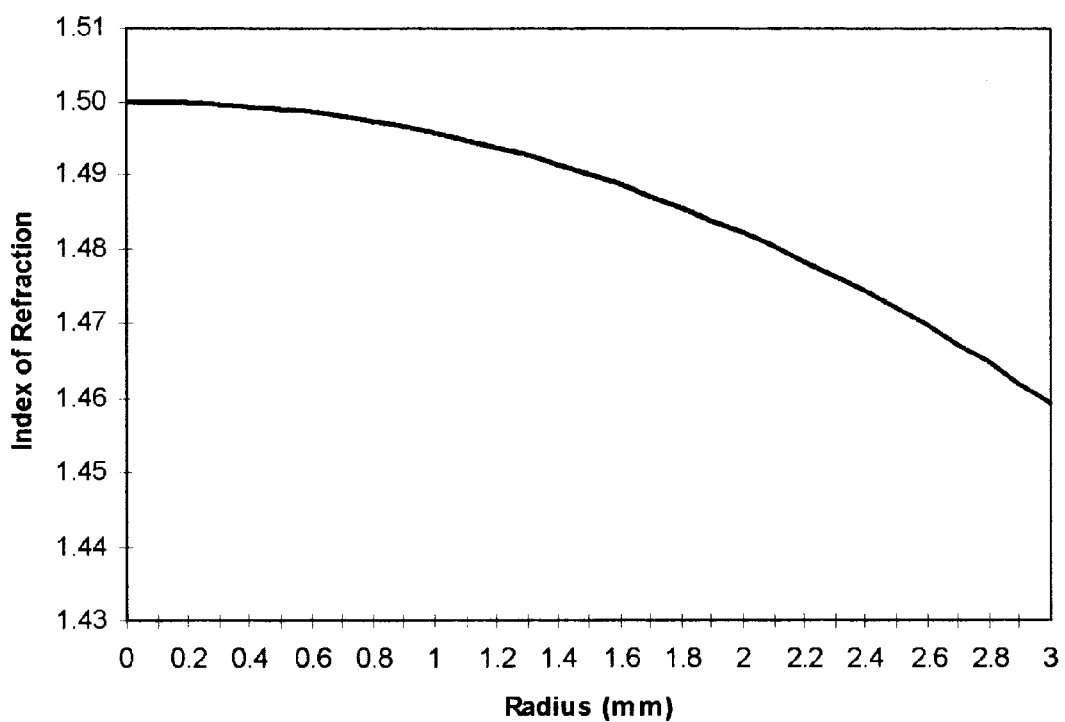
FIG. 3 is a plot of the RGRIN profile of the lens in FIG. 2.
Figure 4:
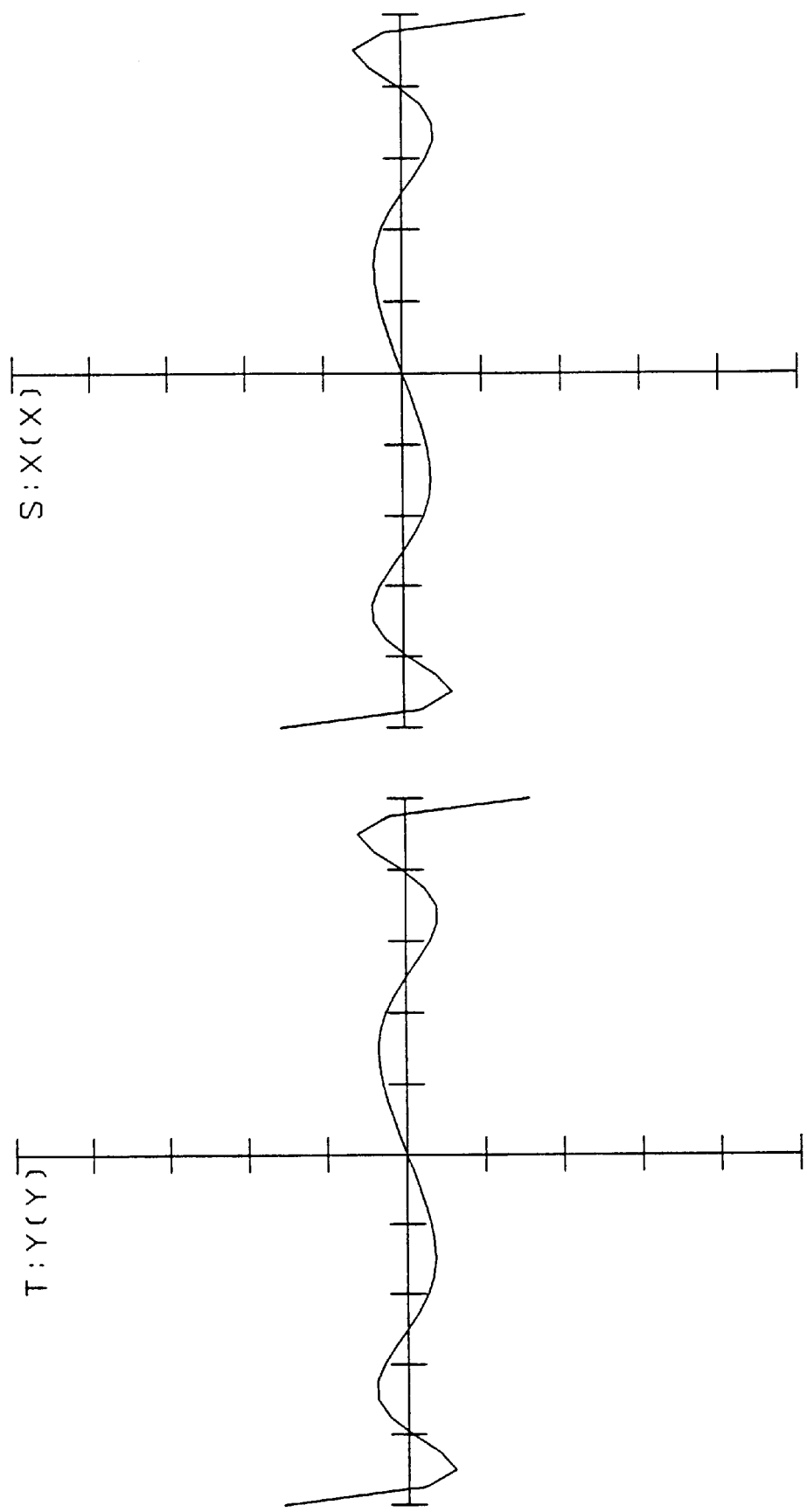
FIG. 4 shows plots of the transverse ray fans of the lens in FIG. 2.
Figure 5:
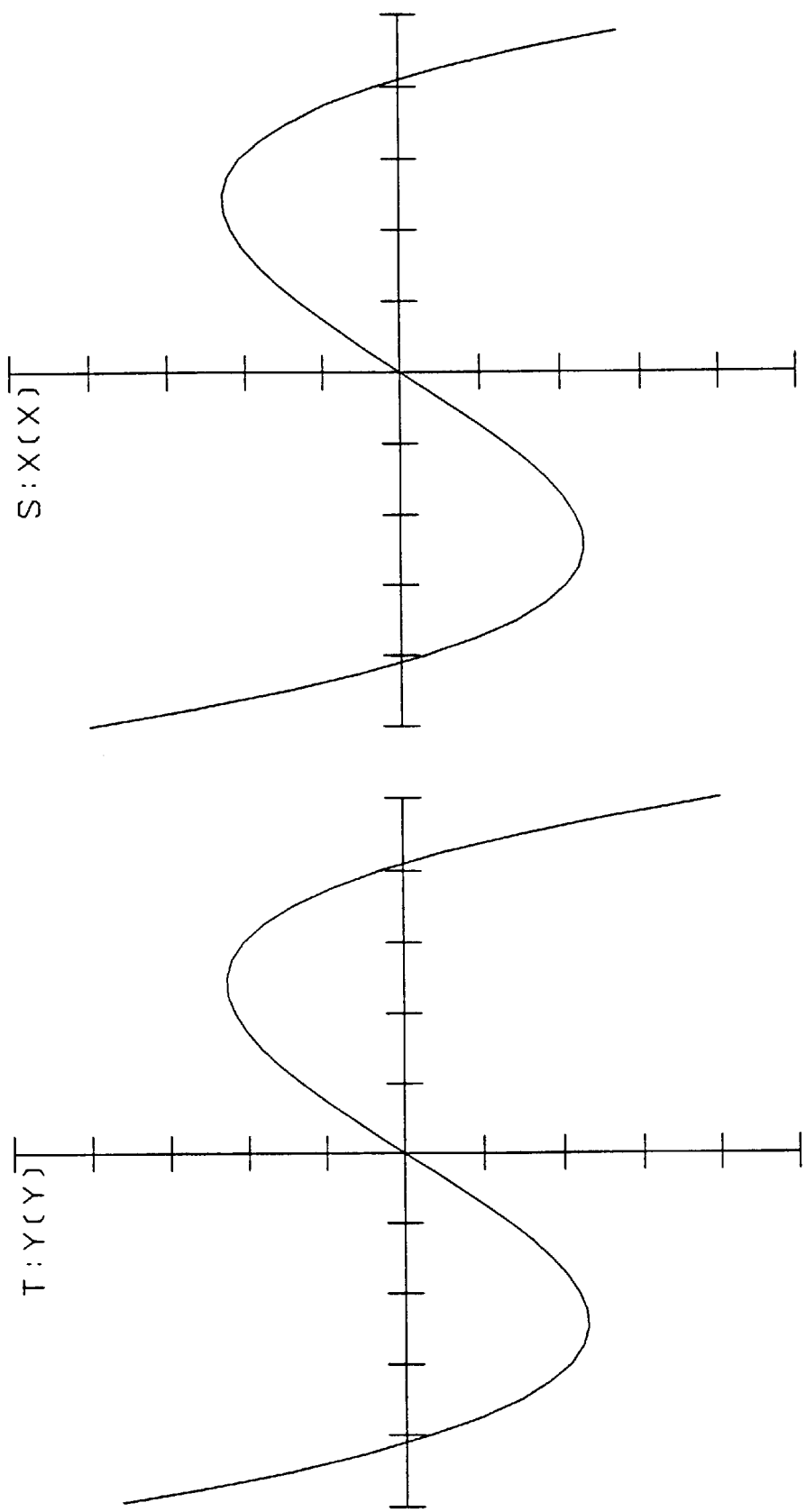
FIG. 5 shows plots of the transverse ray fans of the lens in FIG. 2 when it is coupled with the optics of the myopic eye.

This RGRIN contact lens with a power of −3 diopters is shown in FIG. 2. In FIG. 3, its gradient index profile is plotted. In FIG. 4, transverse ray plots of this lens by itself are shown whereas in FIG. 5, transverse ray plots of this lens after it is coupled with the optics of the myopic eye are shown. A transverse ray plot consists of two graphs, the tangential, or y plot, and the sagittal, or x plot. The transverse coordinate of a ray is plotted against the value of its z crossing which is the vertical axis. The variation in z is a measure of the defocus.

New Schematic Eye Model

Figure 6:
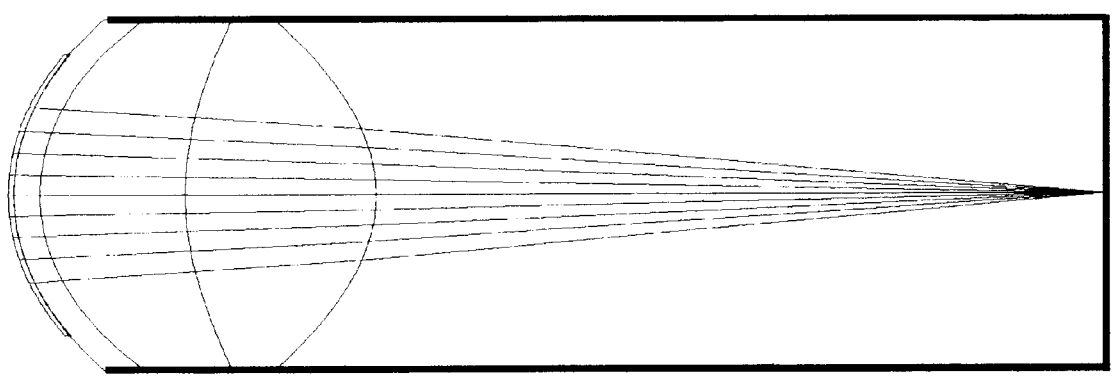
FIG. 6 depicts an RGRIN CL of the present invention positioned on a schematic representation of an eye with the CL optimized for reduced spherical aberration and minimum refractive error when modeled with the optics of the myopic eye with −3.00 diopters of refractive error.

The parameters for the New Schematic Eye Model used here are given in Table 2. A full description of this model and the optical constants may be found in "Optical Modeling of Radial Keratotomy Incision Patterns", by J. Schwiegerling, J. E. Greivenkamp, J. M. Miller, R. W. Snyder, and M. L. Palmer, published in the American Journal of Ophthalmology, June 1996, which is incorporated herein by reference. The layout of the contact lens plus eye optical system is shown in FIG. 6. Starting on the left, this figure shows the CL, the cornea, the aqueous humour, the crystalline lens, the vitreous humour, and finally the retina on the right.

TABLE 2

Parameters of the New Schematic Eye Model

| Surface | Anterior Cornea | Posterior Cornea | Anterior Lens | Posterior Lens |
| --- | --- | --- | --- | --- |
| Radius of Curv. | 7.80 | 6.50 | 11.03 | −5.72 |
| Conic Constant | −0.25 | −0.25 | −4.30 | −1.17 |
| Shape | Ellipsoid | Ellipsoid | Hyperboloid | Paraboloid |
| Thickness | 0.55 | 3.05 | 4.00 | 16.60 |
| Index ($n_d$) | 1.3771 | 1.3374 | 1.4200 | 1.3360 |
| Abbe Number $v_d$ | 57.1 | 61.3 | 47.7 | 61.1 |

Dispersion values for the various media are given, even though the calculations in this study are monochromatic with a wavelength of 587 nm. All other dimensions are in millimeters. To model the eye with varying refractive errors, the anterior surface of the cornea is assumed to be responsible for any dioptric error. The value of Rac, the radius of curvature of the anterior cornea (front surface of the eye), is determined by using the optical design program ZEMAX to yield the prescribed vision error of the wearer in diopters.

Combined Model

The contact lens parameter Rp, the posterior radius of curvature, is always chosen to match the Rac value of the eye model which, in turn, is dependent upon the dioptric error. We have assumed in this study that the tear film (from the natural moisture of the eye) has the same index of refraction as the interior of the eye, the vitreous. ZEMAX lens design code is used to ray trace the eye models with both a homogeneous and RGRIN CL placed on the cornea. From the set of ray trace data, the modulation transfer function (MTF) is determined and the change in MTF is calculated for RGRIN CL of increasing aperture. MTF is also used to measure the loss of contrast sensitivity for a variety of pupil sizes.

Figure 7:
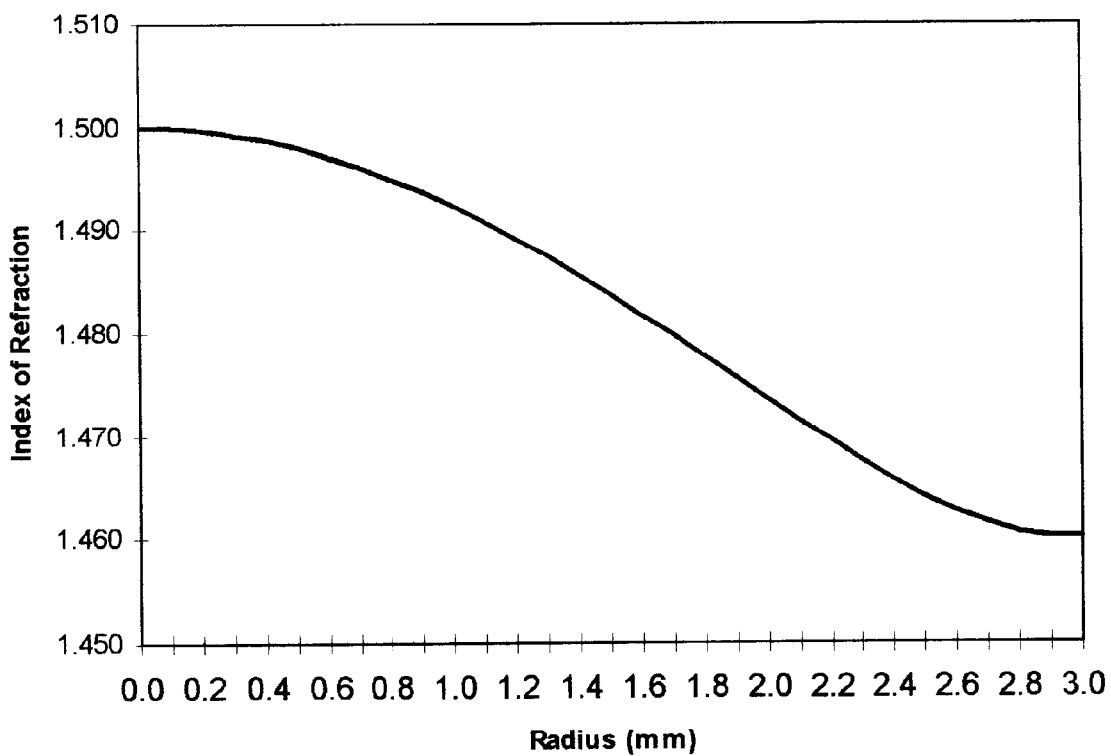
FIG. 7 plots the gradient profile for the lens in FIG. 6.
Figure 8:
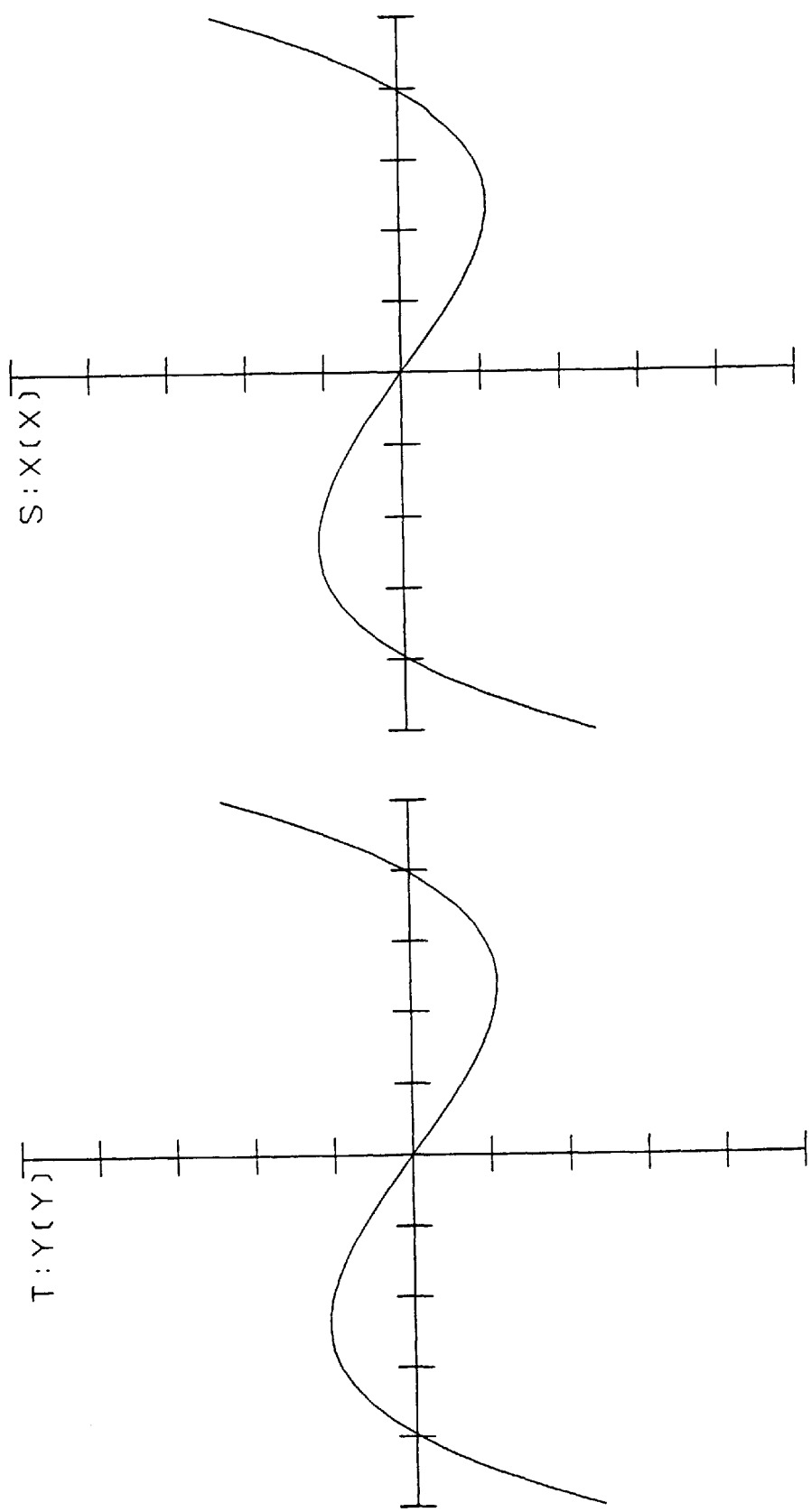
FIG. 8 depicts the transverse ray fans of the stand alone lens in FIG. 6.
Figure 9:
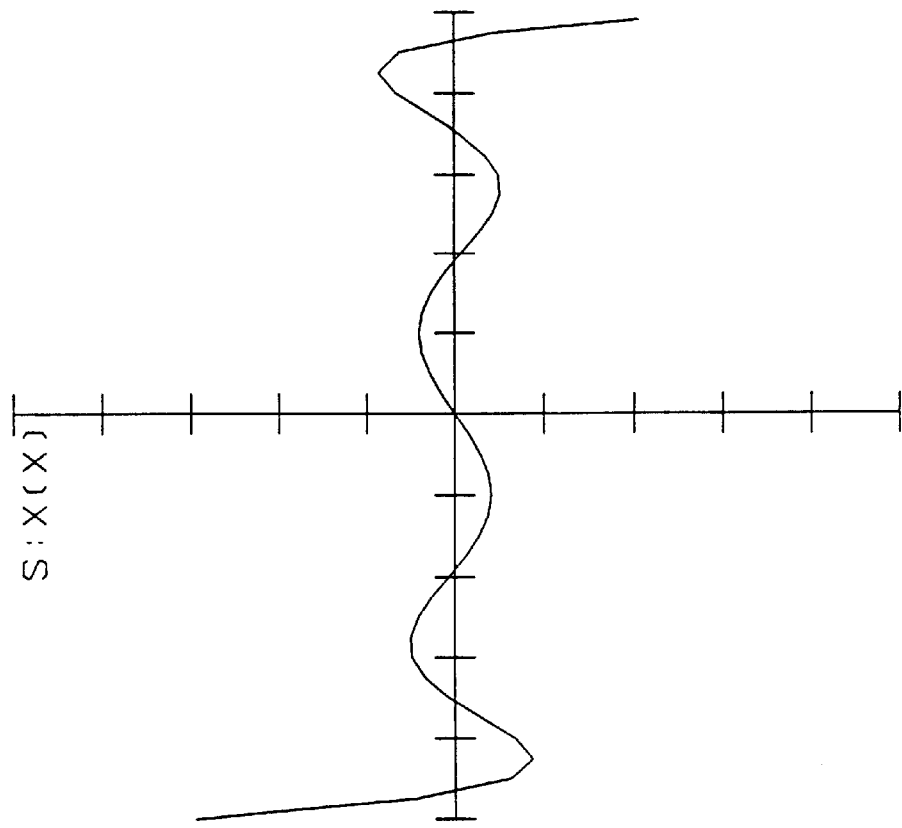
FIG. 9 depicts the transverse ray fans of the lens in FIG. 6 when coupled with the optics of the myopic eye.
Figure 9:
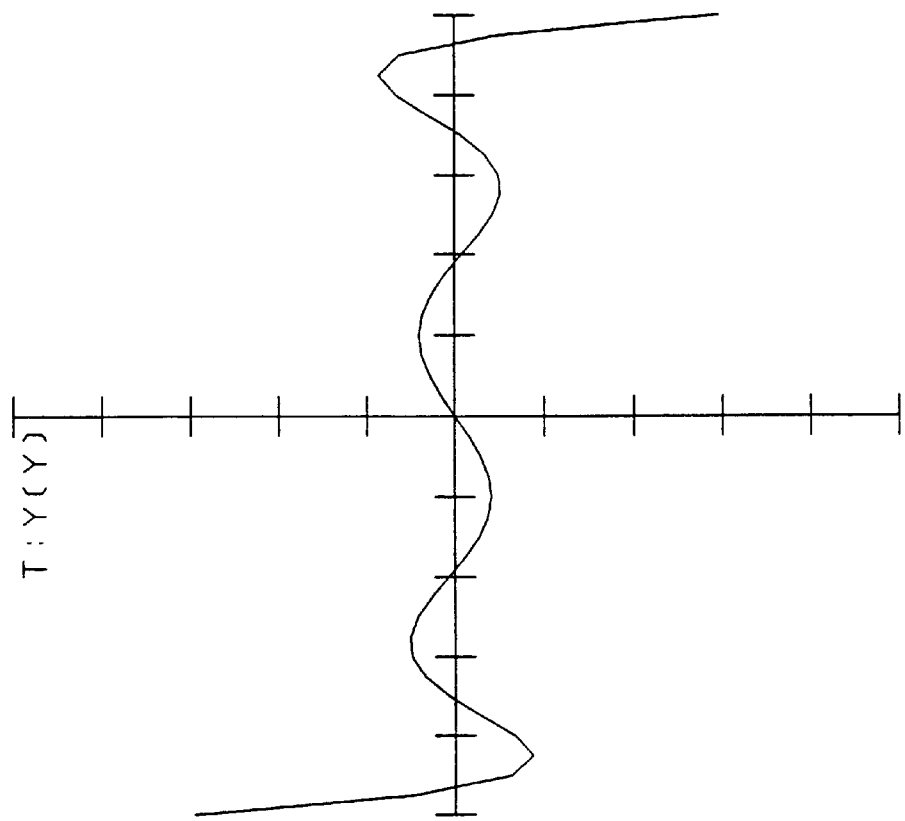

An optical layout for the (−3.00) diopter RGRIN CL, optimized with the eye model, and transverse ray fan plots are shown in FIGS. 6 and 8. The transverse ray fan plot for a combined RGRIN CL and eye model are shown in FIG. 9. This is the ray fan plot relevant to the image on the retina of the eye. The index profile for this lens is plotted in FIG. 7.

Figure 10:
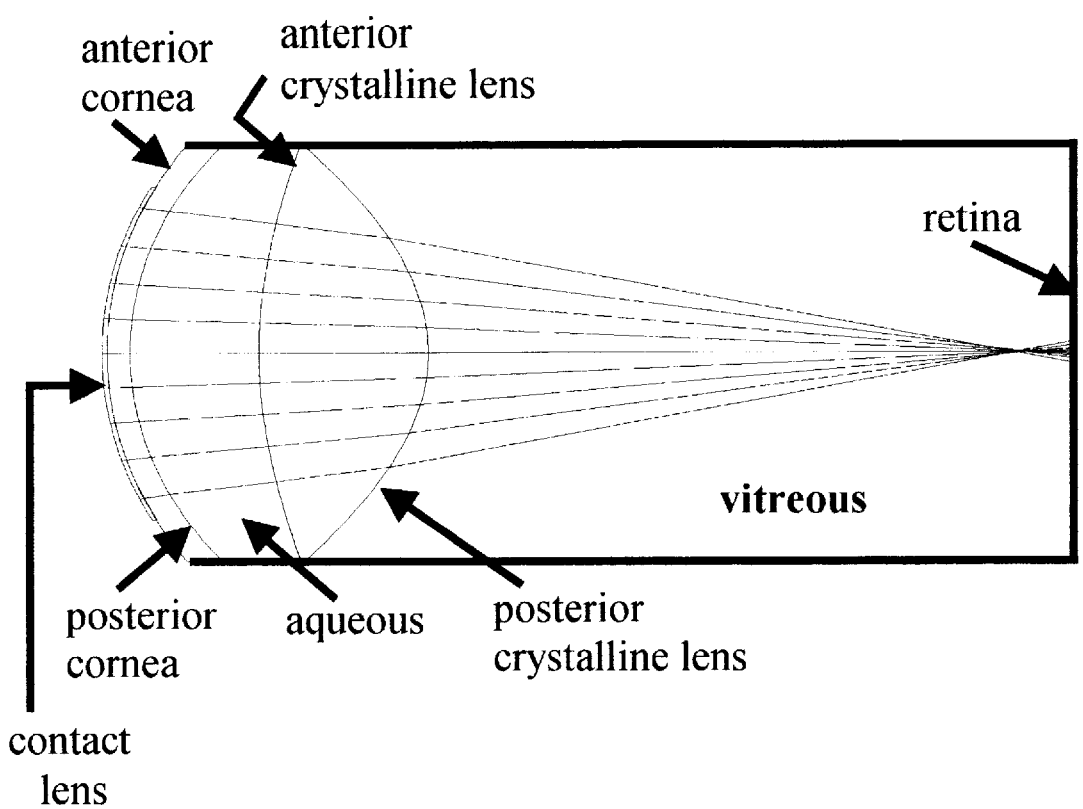
FIG. 10 depicts an homogeneous CL of the prior art positioned on a schematic representation of an eye with the CL optimized for minimum refractive error when modeled with the optics of the Myopic eye with −3.00 diopters of refractive error.
Figure 11:
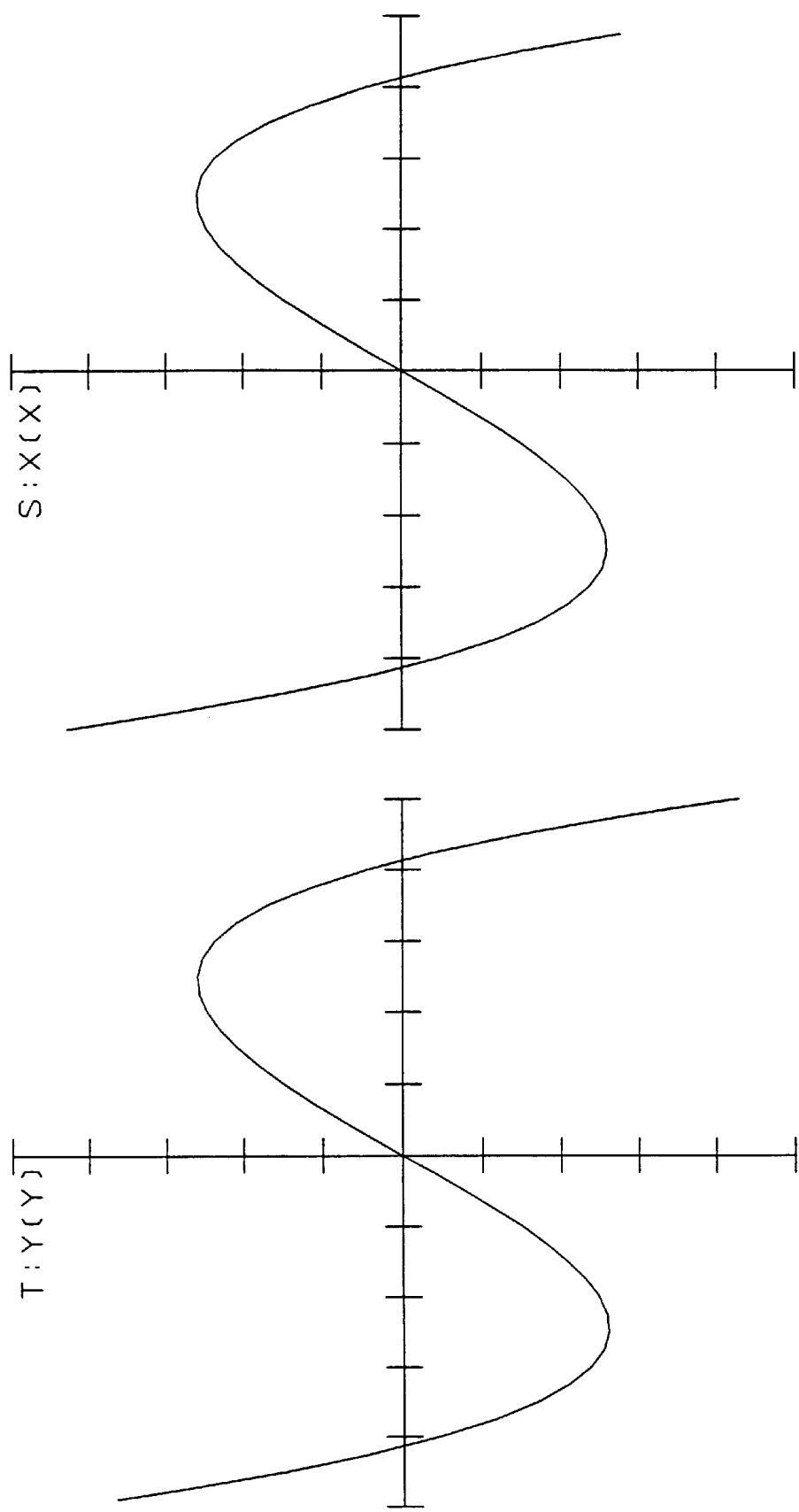
FIG. 11 depicts the transverse ray fans of the lens in FIG. 10 when coupled with the optics of the eye.

These plots are to be compared with the optical layout and transverse ray fan plot for a combined homogeneous CL of the prior art and the present eye model that are shown in FIGS. 10 and 11 respectively. Note in comparison that the design freedom allowed by the addition of the radial gradient has allowed the spherical aberration to be reduced. Minimizing this aberration is important in optimizing the system, especially under low to moderate light illumination, (4–8 mm pupil diameter). The pupil acts as the aperture stop and determines the illuminance and the blur of the image.

Figure 12:
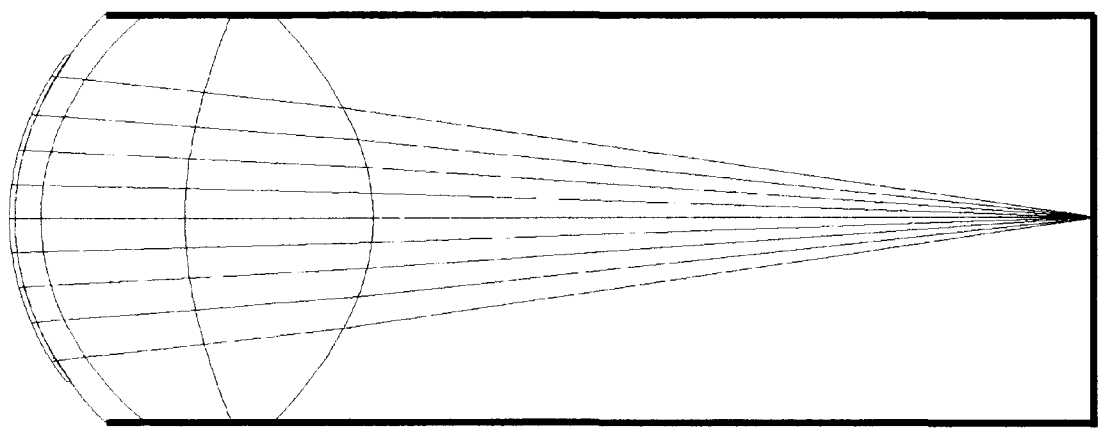
FIG. 12 depicts an RGRIN CL of the present invention optimized for reduced spherical aberration and minimum refractive error when modeled with the optics of the Hyperopic eye with +3.00 diopters of refractive error.
Figure 13:
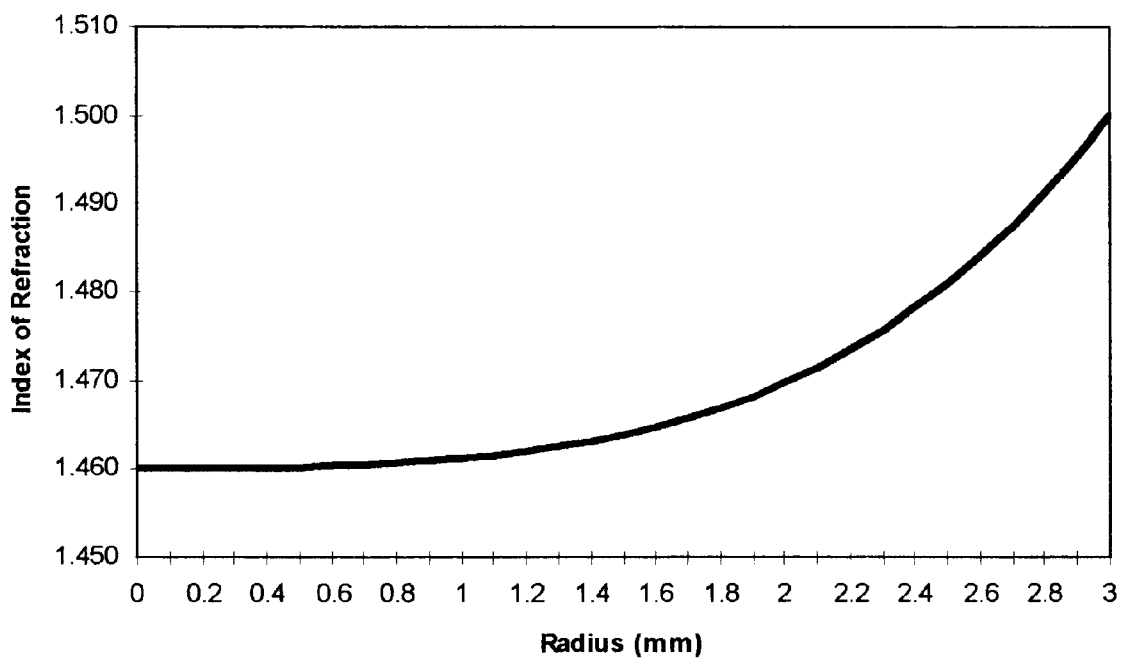
FIG. 13 plots the gradient profile for the lens in FIG. 12.
Figure 14:
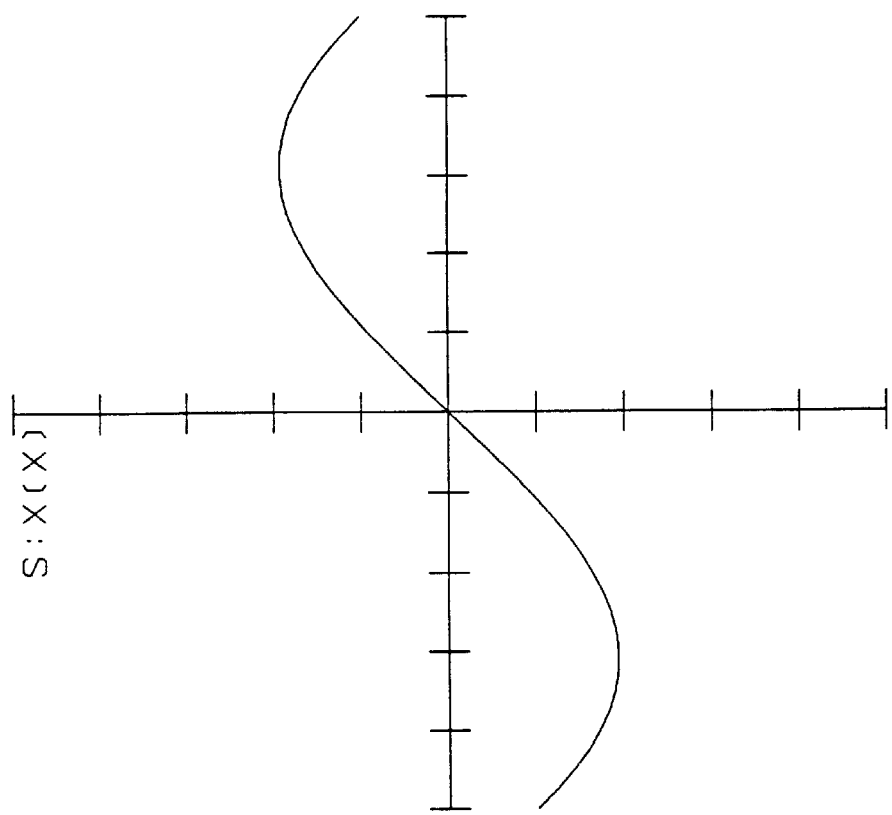
FIG. 14 depicts the transverse ray fans of the lens in FIG. 12 when coupled with the optics of the myopic eye.
Figure 14:
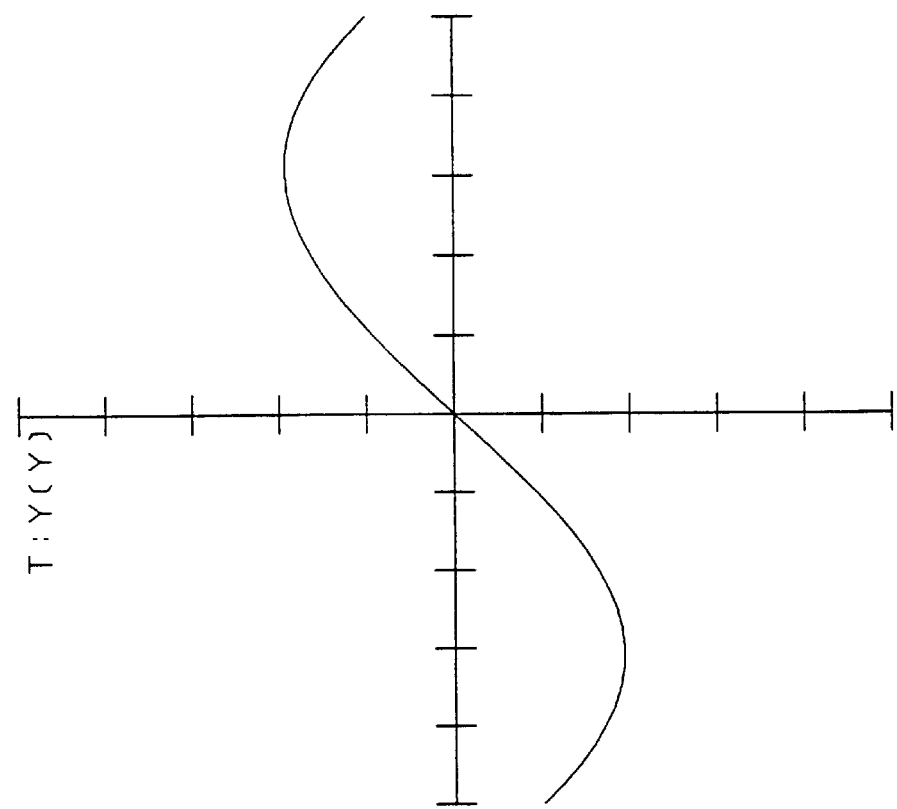
Figure 15:
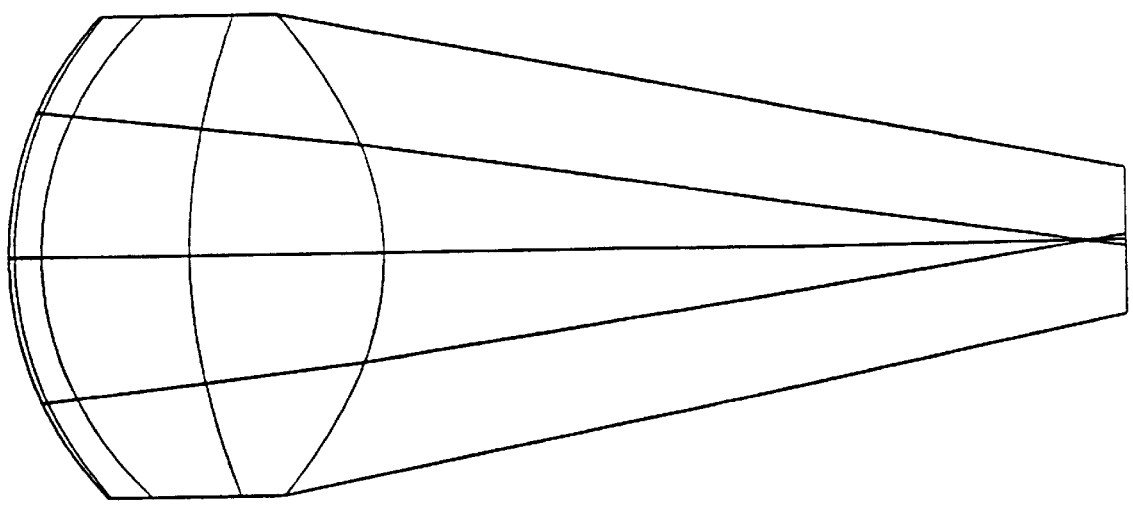
FIG. 15 depicts an homogeneous prior art CL that is optimized for minimum refractive error when modeled with the optics of an eye with +3.00 Diopters of refractive error.
Figure 16:
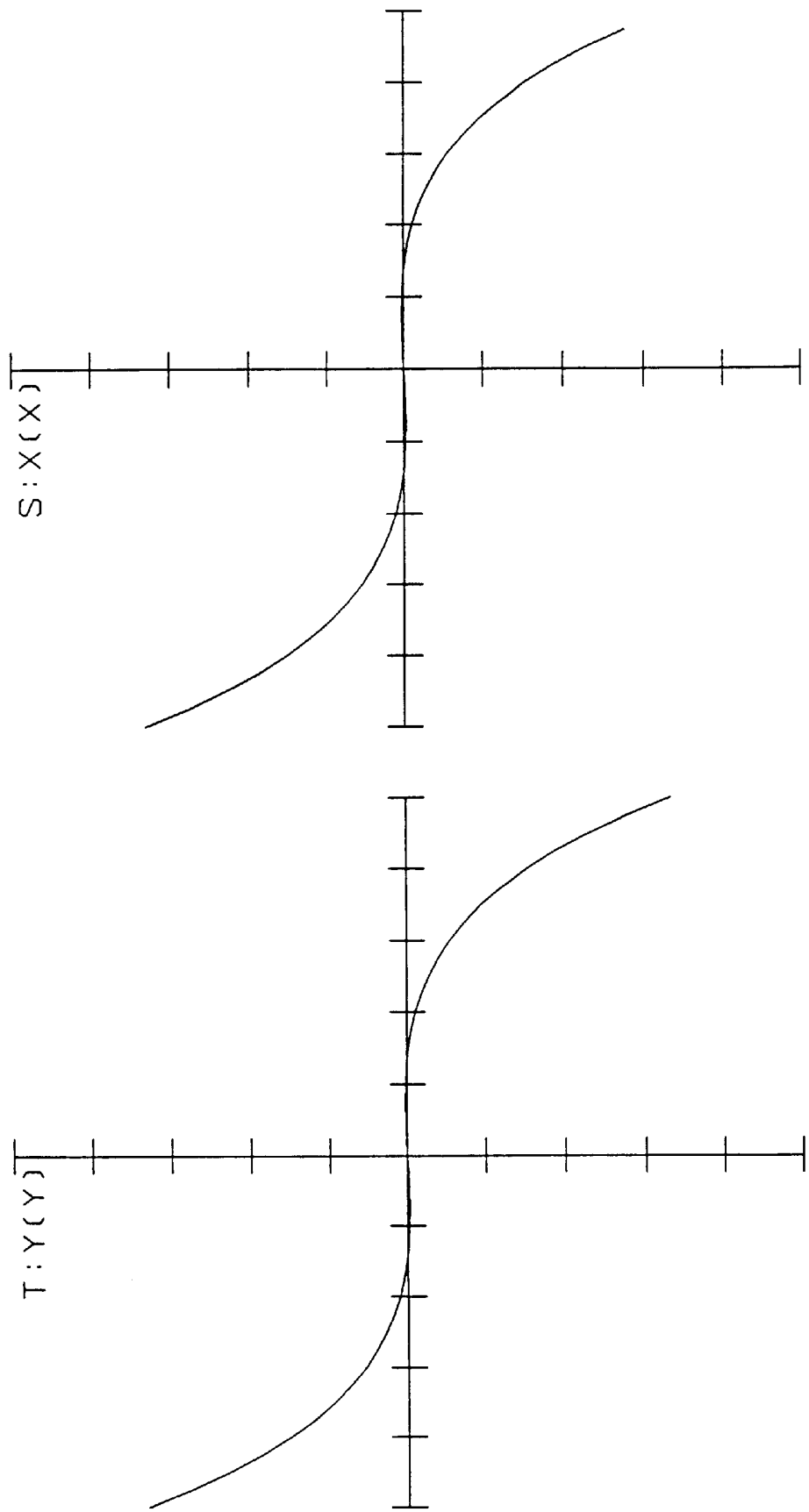
FIG. 16 depicts the transverse ray fans of the lens in FIG. 15 when coupled with the optics of the eye.

A similar comparison of an RGRIN CL and an HCL for a (+3.00) diopter lens is shown in FIGS. 12, 13, and 14, and FIGS. 15 and 16 respectively. The optical layout with the eye model and the resultant transverse ray fan plots are shown in FIGS. 12 and 14. The index profile for this lens is plotted in FIG. 13. The comparison plots for a combined homogeneous CL of the prior art and the present eye model are shown in FIGS. 15 and 16 respectively.

Figure 17:
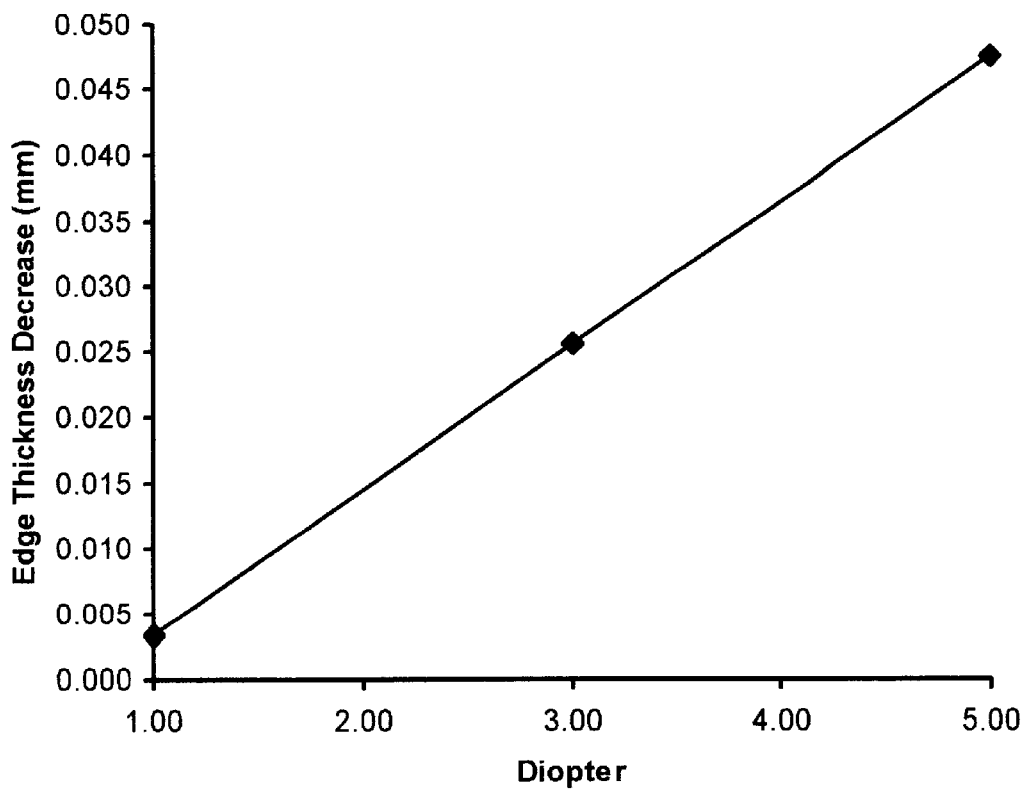
FIG. 17 depicts the edge thickness reduction of a minus lens when going from homogeneous material of the prior art to RGRIN material of the present invention.
Figure 18:
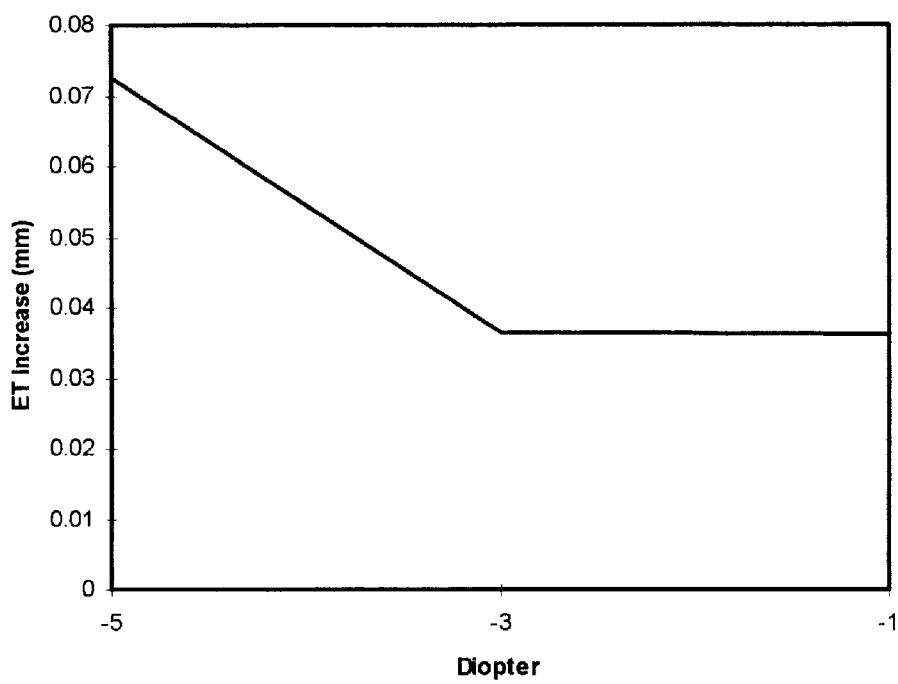
FIG. 18 depicts the edge thickness increase of a plus lens when going from homogeneous material of the prior art to RGRIN material of the present invention.

In FIGS. 17 and 18, the edge thickness decrease for an RGRIN lens over a homogeneous lens of the prior art is shown and negative and positive diopter correction respectively.

Note that in all the above cases the design freedom allowed by the addition of the radial gradient has allowed the spherical aberration of the lens to be reduced and the thickness of the lens to remain fairly constant. Note that the parameters clearly show that it is important to consider the full optical system of the eye, namely the combined model, not simply the CL lens in isolation.

Figure 19:
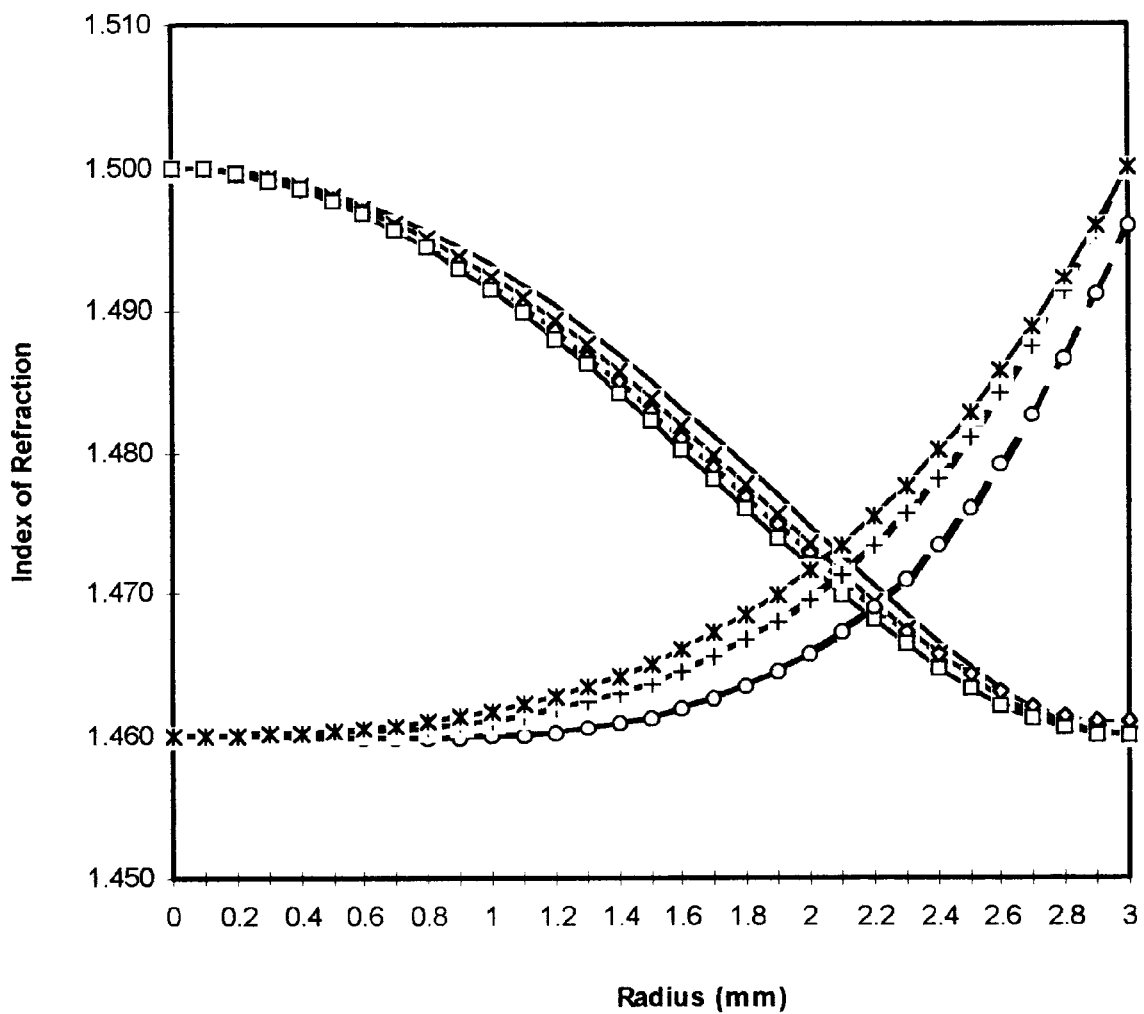
FIG. 19 shows RGRIN CL gradient profiles used as an example in the invention to correct for refractive errors and reduce spherical aberration of eyes ranging from −5.00 to +5.00 diopters refractive error.
Figure 20:
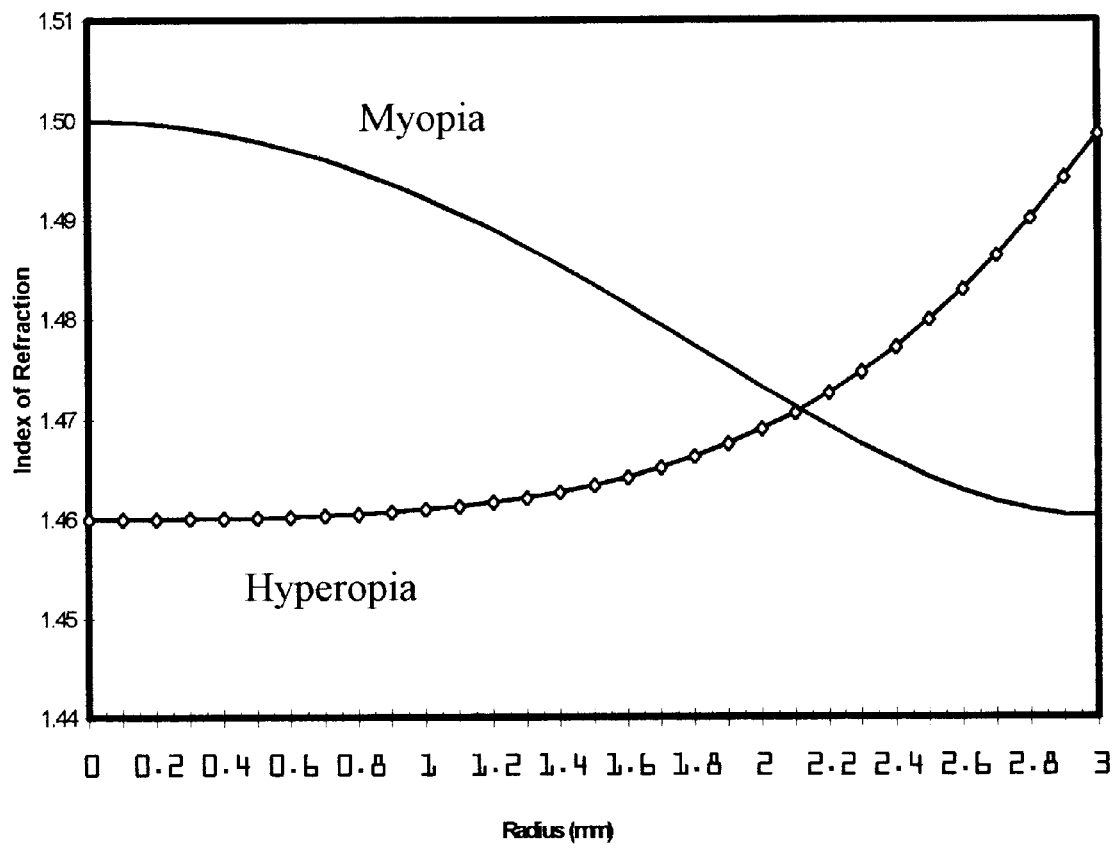
FIG. 20 shows the average profile for Myopic and Hyperopic and emmetropic condition.

In FIG. 19 the index profile is plotted for the CL designs given in Table 3. The index profile is smooth and monotonic. Note that both an increasing and a decreasing index profile are required for the optimum corrective lens for myopia and hyperopia. The similarity in profiles for the myopic correction and the similarities in profiles for the hyperopic correction suggest that only one profile for each range, (negative and positive refractive error) need be considered for adequate correction. FIG. 20 shows the RGRIN profiles necessary to correct for average myopia and for average hyperopia.

Visual Performance

A good description of MTF and contrast sensitivity (CSF) may be found in the paper "Optical Modeling of Radial Keratotomy Incision Patterns", by J. Schwiegerling, J. E. Greivenkamp, J. M. Miller, R. W. Snyder, and M. L. Palmer, referred to earlier. This paper refers to the published papers "Interpreting multifocal intraocular lens modulation transfer functions", by A. Lang and V. Portney, J. Cataract Refract. Surg. Vol 19, pp505–12, 1993, and "Phenomenological model for interpreting the clinical significance of the in vitro optical transfer function", by A. Lang, V. Lakshminarayanan and V. Portney V., J. Opt. Soc.Am. A, Vol 10, pp1600–10, 1993 which are also incorporated herein by reference.

We now quote from the article of Schwiegerling, et. al:

"The MTF describes the reduction in contrast of a sinusoidal target as it is imaged through an optical system and onto the retina. The MTF is usually given as a function of spatial frequency v. For this study, two spatial frequencies are chosen to correspond to the 20/40 and 20/20 lines on a Snellen eye chart. These frequencies are 15 cycles/deg and 30 cycles/deg respectively." The difference in MTF is calculated by comparing the MTF at these frequencies with and without the RGRIN CL.

"The MTF increase/decrease can be used to predict the increase/decrease in contrast sensitivity if the form of the retina and brain function of an individual is assumed. Clinically, the external contrast sensitivity function ($CSF_{external}$) can be measured by displaying a series of sinusoidal targets of diminishing contrast of modulation to an observer and determining the minimum modulation target that can be detected. The reciprocal of this minimum modulation $m_{external}$ is the contrast sensitivity. Here, the subscript external has been added to denote a sinusoidal target that is external to the eye. The retinal contrast sensitivity function ($CSF_{retina}$), which bypasses the eye optics and projects a sinusoidal pattern of modulation $m_{retina}$ directly onto the retina has been measured. The MTF of the eye at a given spatial frequency $\xi$ is given by $$MTF(\xi) = \frac{m_{retina}}{m_{external}} = \frac{CSF_{external}(\xi)}{CSF_{retina}(\xi)},$$

Differentiating the above equation and rearranging gives the change in contrast sensitivity $\Delta CSF$ in terms of the change in modulation transfer function $\Delta MTF$."

$$\Delta CSF(\xi)_{external} = [CSF(\xi)_{retina}]\Delta MTF(\xi)$$

Through the use of the preceding equations, the visual performance of an ametropic eye model with a homogeneous and an RGRIN CL can be compared. As a baseline, we will use an emmetropic eye model. The difference in contrast sensitivity (delta CSF) between the emmetropic eye model and an ametropic eye model with both types of corrective lenses will be compared for refractive errors ranging from −5.00 to +5.00 diopters. In this manner, no change in contrast sensitivity means that the contact lens corrected eye model has equivalent visual performance to the emmetropic eye. A loss in contrast sensitivity (delta CSF negative) means the contact lens corrected eye model has inferior visual performance relative to the emmetropic eye. Finally, a gain in contrast sensitivity (delta CSF positive) means the contact lens corrected eye model has superior visual performance over the emmetropic eye.

Figure 21:
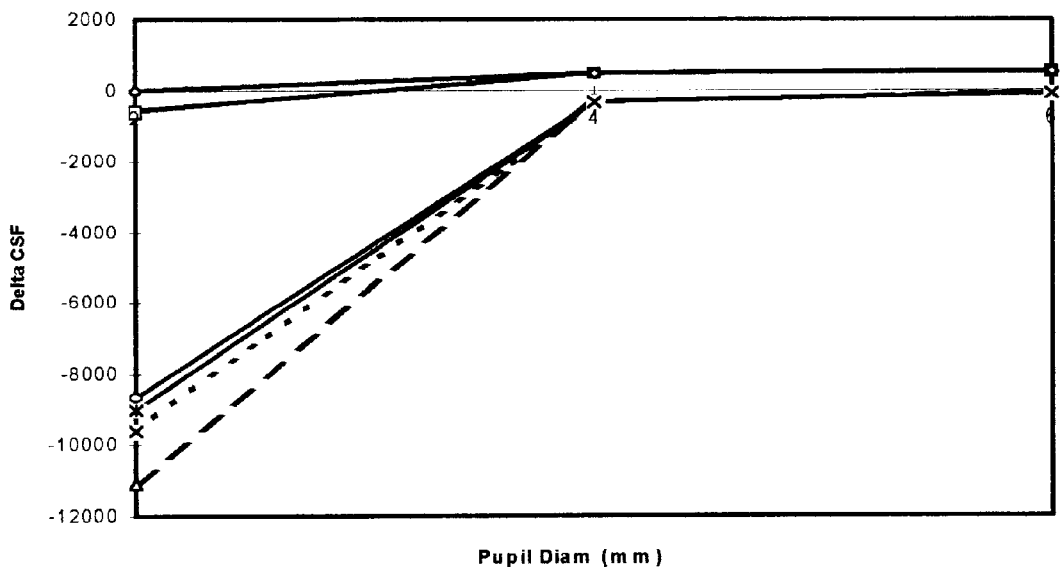
FIG. 21 shows the difference in the CSF, or contrast sensitivity function, for homogeneous and RGRIN contact lenses at a spatial frequency of 30 cycles/deg.

FIG. 21 shows the delta CSF for homogeneous and RGRIN contact lenses at a spatial frequency of 30 cycles/deg. This spatial frequency corresponds to the 20/20 line on a Snellen chart and is associated with acuity tasks such as reading fine print. For all pupil sizes, the RGRIN lens has superior performance over the homogeneous lens. Furthermore, the RGRIN lens has equivalent performance to that of the emmetropic eye. Consequently, the visual acuity with the RGRIN lens is equivalent to the emmetropic eye under all lighting conditions.

Figure 22:
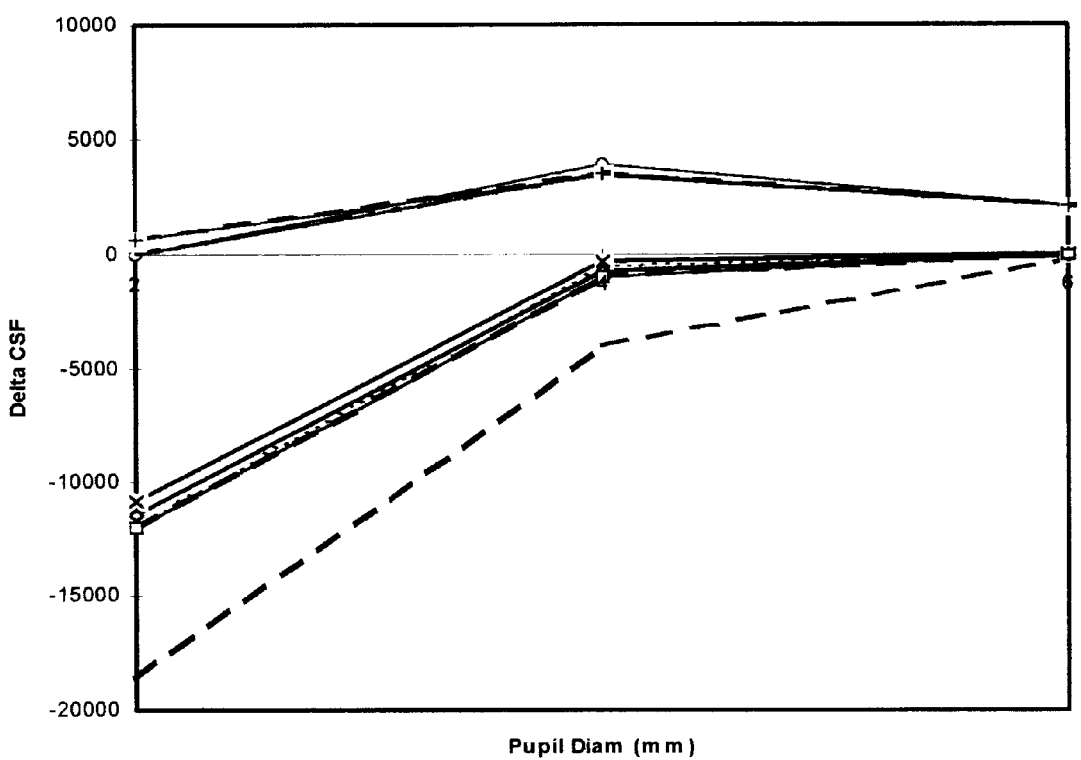
FIG. 22 shows the difference in the CSF for the homogeneous and RGRIN contact lens at a spatial frequency of 15 cycles/deg.

FIG. 22 shows the delta CSF for the homogeneous and RGRIN contact lens at a spatial frequency of 15 cycles/deg. This spatial frequency is associated with the 20/40 line on the Snellen chart as is associated with visual tasks such as reading street signs and facial recognition. Again, for all pupil sizes, the RGRIN lens has superior performance over the homogeneous lens. In addition, the RGRIN lens offers superior performance to the emmetropic eye for larger pupil sizes (lower lighting conditions). Consequently, visual performance under low levels of illumination is markedly improved. This result is a consequence of reducing the spherical aberration of the eye for large pupils, effectively eliminating night myopia.

Figure 23:
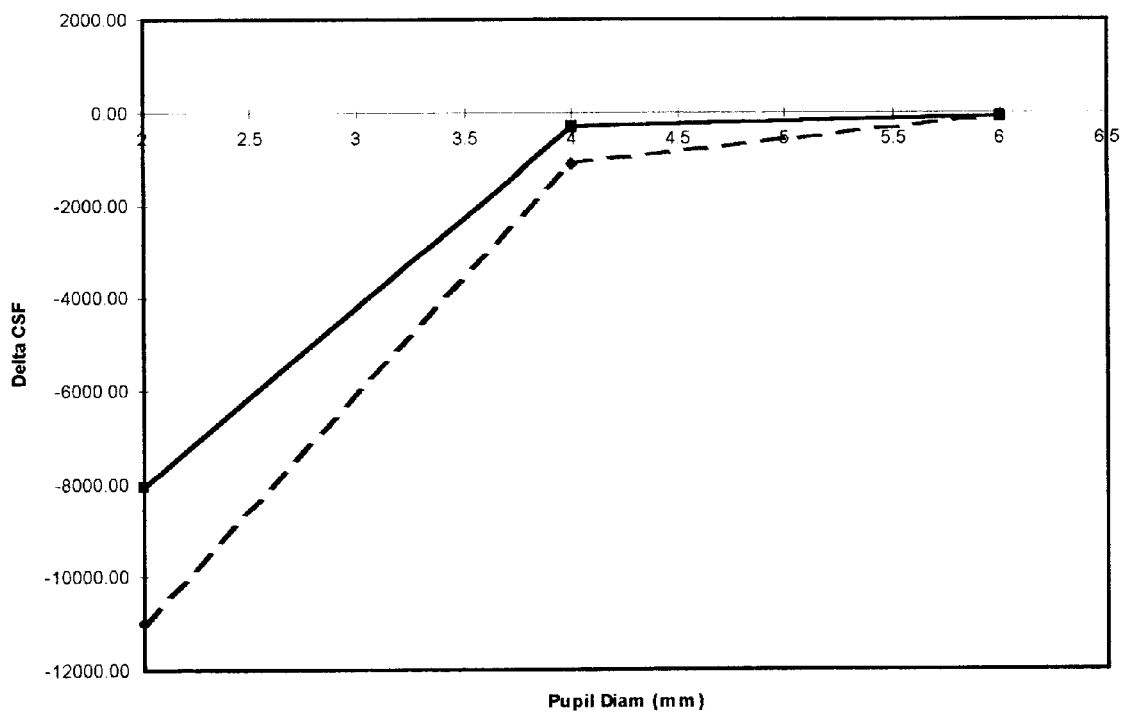
FIG. 23 shows the average difference in the CSF for hyperopic and myopic correction for a homogeneous CL at 15 cycles/deg and 30 cycles/deg.
Figure 24:
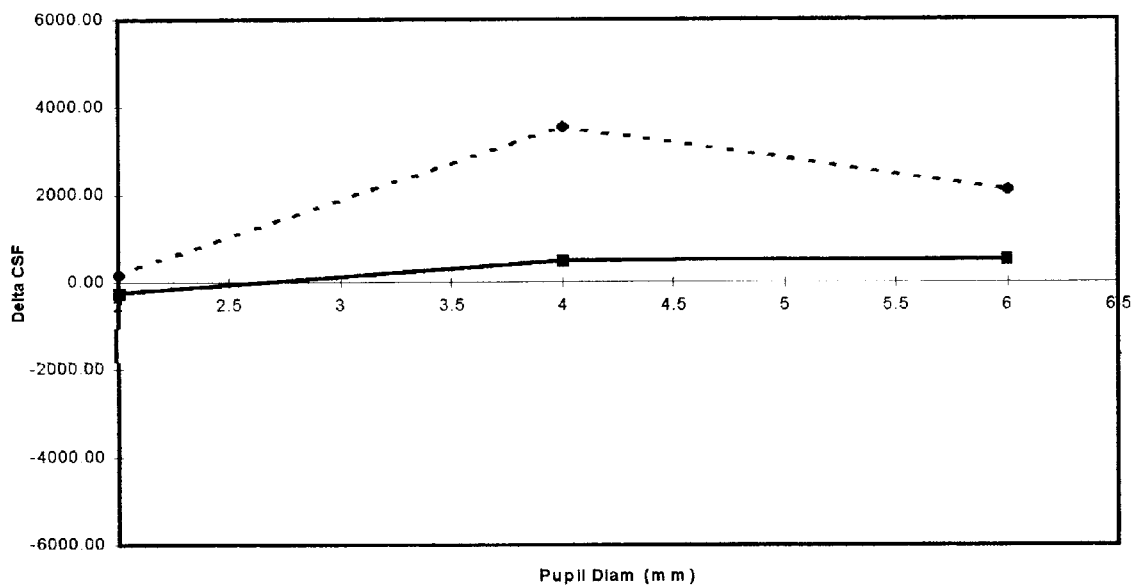
FIG. 24 shows the average difference in the CSF for hyperopic and myopic correction for an RGRIN CL at 15 cycles/deg and 30 cycles/deg.

FIGS. 23 and 24 average the delta CSF over the dioptric error range under consideration. For this range, the RGRIN lenses have superior performance over homogenous lenses, improved contrast sensitivity and enhance visual performance for mid-spatial frequencies under low-lighting conditions. These results suggest that the RGRIN CL is a promising technique for corrective refractive error. Note that the CSF can also be significantly improved for a diopter error of zero. This means that RGRIN CL's may be used to improve vision for emmetropic, or (20,20), vision.

Table 3: Combined Model Parameters for Contact Lens Designs [printed on separate page]

Comparison of RGRIN with homogeneous lens material

From the nominal design of the RGRIN contact lenses given above, several advantages possessed by the RGRIN CL over the homogeneous CL design become evident. These include:

(1) Since the index gradient provides part of the optical power the radius of curvature of the external surface can be designed such that the edge of the contact lens has equal or greater thickness compared to the center. This will allow thinner lenses to be made, increasing the wearer comfort since a thinner lens will have less impact on the eyelid and will also allow better transport of oxygen through the CL to the surface of the eye. This may increase comfort, wear time and stability.

(2) The RGRIN lens allows the optical designer more degrees of freedom, and hence both focus errors and spherical aberration can be reduced. That is, the active region of the lens that can be utilized and still yield a sharp image can be increased substantially. For example, in dim light, the pupil of the eye dilates, thereby increasing the spherical aberrations inherent in a simple lens. Correcting spherical aberration will improve contrast sensitivity.

(3) One common complaint from CL wearers is that their eyesight deteriorates when the CL drifts around in the eye and does not stay centered on the iris. A larger 'sweet spot' will ameliorate this problem since the lens still produces a good image even off center. The RGRIN CL can be designed with a larger 'sweet spot', thereby providing a much sharper image and more tolerance to decenter of the CL on the pupil.

(4) Improved night vision, contrast sensitivity and resolution under low light level situations can be achieved by utilizing the additional optical design freedom of the RGRIN material.

(5) The use of RGRIN lens material allows the CL to be thin with the associated improved diffusion and to have the optical performance across a large diameter to be comfortable to the wearer.

(6) The RGRIN contact lenses proposed here can be fabricated using the same lathing or molding methods used at present for homogeneous contact lenses by utilizing plastic CL buttons cut from gradient preforms.

(7) By choosing the appropriate index profile, a flat button can be pressed into a CL with nested spherical surfaces with no need for further shaping. The optical power of the lens arises solely from the radial gradient in the index of refraction.

Figure 25:
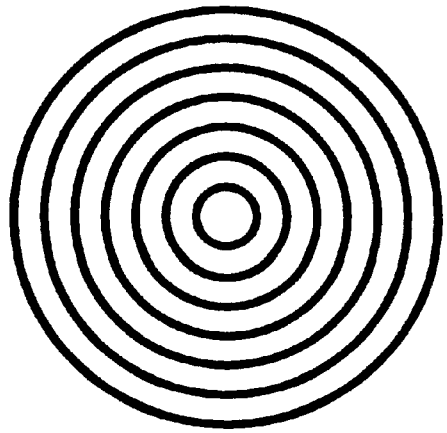
FIG. 25 shows the steps for fabricating an anamorphic EGRIN lens from a radial lens.
Figure 25:
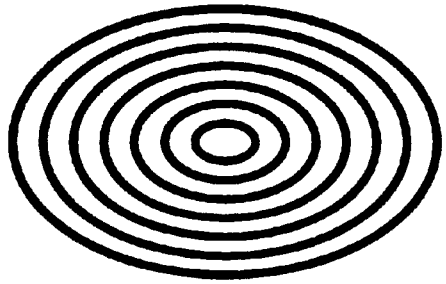
Figure 25:
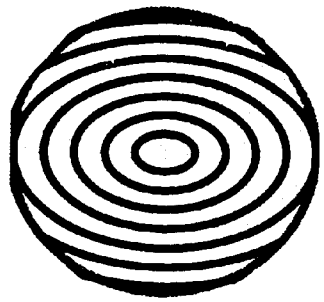

(8) By choosing an appropriate EGRIN index profile for the flat button, a CL can be fabricated that can be used to correct astigmatism as well as power (focus) errors of the eye. This fabrication process is illustrated in FIG. 25.

A new and useful type of gradient of one embodiment of the invention can be produced by drawing a radial index profile preform through an elliptical orifice. After cutting and reshaping to a circular cross section, this preform would possess an elliptical gradient, or EGRIN, profile. For this type of profile, the focal length in the x- and y-directions are different because the x and y index profiles differ. This is an anamorphic gradient index lens which can be used to correct astigmatism. The process steps are illustrated in FIG. 25. In the first step, a schematic of an original RGRIN preform is shown. The next step shows the preform elliptical gradient profile after drawing the original preform through an elliptical orifice. Next, the preform is shaped to a circular cylinder using conventional techniques to provide a cylindrical preform having an elliptical gradient profile. Anamorphic RGRIN CL's can then be generated as described above.

It is clear from the above discussion that the design of an RGRIN and an EGRIN contact lens requires a full understanding and physical characterization of the lens material and a sufficiently accurate model of the eye.

The claims in this invention are not tied to the particular eye model presented here. The methodology described here may be used with any model that accurately describes the optical performance of the eye.

TABLE 3

| Δ power | n0 | Δn | RA CL | RA cornea | RP cornea | CT | ET | Diam | MTF @ 15 cycles/deg | | | MTF @ 30 cycles/deg | | |
|---|---|---|---|---|---|---|---|---|---|---|---|---|---|---|
| | | | | | | | | | 2 mm | 4 mm | 6 mm | 2 mm | 4 mm | 6 mm |
| EYE | | | | | | | | | | | | | | |
| −5 | 1.377 | 0.000 | NA | 8.809 | 6.500 | NA | NA | 10.000 | NA | NA | NA | NA | NA | NA |
| −3 | 1.377 | 0.000 | NA | 83.76 | 6.500 | NA | NA | 10.000 | NA | NA | NA | NA | NA | NA |
| 0 | 1.377 | 0.000 | NA | 7.800 | 6.500 | NA | NA | 10.000 | 90 | 87 | 36 | 82 | 68 | 27 |
| 3 | 1.377 | 0.000 | NA | 7.298 | 6.500 | NA | NA | 10.000 | NA | NA | NA | NA | NA | NA |
| 5 | 1.377 | 0.000 | NA | 6.998 | 6.500 | NA | NA | 10.000 | NA | NA | NA | NA | NA | NA |
| EYE + Homo-CL | | | | | | | | | | | | | | |
| −5 | 1.480 | 0.000 | 8.886 | 8.809 | 6.500 | 0.120 | 0.097 | 10.000 | 85 | 90 | 50 | 69 | 79 | 37 |
| −3 | 1.480 | 0.000 | 8.391 | 8.376 | 6.500 | 0.120 | 0.004 | 10.000 | 90 | 78 | 35 | 82 | 50 | 22 |
| 0 | 1.480 | 0.000 | 7.800 | 7.800 | 6.500 | 0.000 | 0.000 | 10.000 | 90 | 87 | 36 | 82 | 68 | 27 |
| 3 | 1.480 | 0.000 | 7.382 | 7.298 | 6.500 | 0.120 | 0.067 | 10.000 | 80 | 86 | 44 | 53 | 64 | 28 |
| 5 | 1.480 | 0.000 | 7.085 | 6.998 | 6.500 | 0.120 | 0.055 | 10.000 | 80 | 85 | 40 | 48 | 59 | 26 |
| EYE + GRIN-CL | | | | | | | | | | | | | | |
| −5 | 1.460 | 0.019 | 8.960 | 8.809 | 6.500 | 0.120 | 0.129 | 10.000 | 90 | 95 | 93 | 80 | 87 | 85 |
| −3 | 1.460 | 0.019 | 8.521 | 8.376 | 6.500 | 0.120 | 0.130 | 10.000 | 90 | 95 | 90 | 78 | 83 | 78 |
| 0 | 1.460 | 0 | 7.800 | 7.800 | 6.500 | 0.120 | 0.000 | 10.000 | 90 | 87 | 36 | 82 | 68 | 27 |
| 3 | 1.460 | 0.040 | 7.290 | 7.298 | 6.500 | 0.120 | 0.119 | 10.000 | 90 | 96 | 98 | 82 | 92 | 95 |
| 5 | 1.460 | 0.040 | 6.999 | 6.998 | 6.500 | 0.120 | 0.120 | 10.000 | 92 | 96 | 97 | 84 | 93 | 94 |
| | | | | | | | | CSF Retina | 300 | 100 | 30 | 300 | 12 | 8 |

List of Reference Numerals

10—Standard homogeneous contact lens with ground spherical surfaces.
12—Spherical external.
14—Homogeneous lens material.
15—Central thickness.
16—Spherical external rear surface.
17—Edge thickness.
18—Spherical external front surface.

What is claimed is:

1. A contact lens comprising:

an optical material having a spatially varying index of refraction profile including a radial gradient component; and said contact lens having an anterior surface and a posterior surface and a thickness therebetween, said contact lens thickness being constant over substantially the entire diameter of the lens.

2. The contact lens of claim 1 wherein said spatially varying index of refraction includes an axial gradient component.

3. A contact lens comprising:

an optical material having a spatially varying index of refraction profile; and said spatially varying index of refraction comprising both elliptical and axial gradient indices profiles.

4. A contact lens comprising:

an optical material having a spatially varying index of refraction profile; and said spatially varying index of refraction comprising both radial and axial gradient indices profiles.

5. A contact lens comprising:

an optical material having a spatially varying index of refraction profile; and said spatially varying index of refraction comprising an elliptical gradient index profile.

* * * * *